United States Patent
Abe

(10) Patent No.: US 7,967,117 B2
(45) Date of Patent: Jun. 28, 2011

(54) SUSPENSION SPRING ADJUSTING APPARATUS OF HYDRAULIC SHOCK ABSORBER

(75) Inventor: Shigenobu Abe, Shizuoka (JP)

(73) Assignee: Showa Corporation, Saitama (JP)

(*) Notice: Subject to any disclaimer, the term of this patent is extended or adjusted under 35 U.S.C. 154(b) by 1027 days.

(21) Appl. No.: 11/424,486

(22) Filed: Jun. 15, 2006

(65) Prior Publication Data

US 2007/0144847 A1 Jun. 28, 2007

(30) Foreign Application Priority Data

Dec. 22, 2005 (JP) .................................. 2005-370681

(51) Int. Cl.
*F16F 9/34* (2006.01)
*B60G 17/00* (2006.01)

(52) U.S. Cl. .................. 188/299.1; 267/218; 267/177; 280/6.157

(58) Field of Classification Search .................. 310/413, 310/418
See application file for complete search history.

(56) References Cited

U.S. PATENT DOCUMENTS

| | | | | |
|---|---|---|---|---|
| 4,123,065 A * | 10/1978 | Watanabe | .................. | 369/77.11 |
| 4,159,105 A * | 6/1979 | Vander Laan et al. | ........ | 267/218 |
| 4,242,055 A * | 12/1980 | Felter | ............................ | 417/362 |
| 4,497,630 A * | 2/1985 | Oliver | ............................ | 434/224 |
| 4,824,180 A * | 4/1989 | Levrai | ............................ | 303/22.5 |
| 4,825,972 A * | 5/1989 | Shimizu | ......................... | 180/444 |
| 5,022,501 A * | 6/1991 | Hayashi et al. | ................ | 188/300 |
| 5,098,120 A * | 3/1992 | Hayashi et al. | ................ | 267/276 |
| 5,181,696 A * | 1/1993 | Abe | ............................ | 267/64.17 |
| 5,281,988 A * | 1/1994 | Martin | ............................ | 396/59 |
| 5,401,053 A * | 3/1995 | Sahm et al. | ................. | 280/5.502 |
| 5,480,011 A * | 1/1996 | Nagai et al. | ................. | 188/266.3 |
| 5,597,054 A * | 1/1997 | Nagai et al. | ................. | 188/266.6 |
| 5,649,611 A * | 7/1997 | Nakadate | .................. | 188/322.13 |
| 5,730,261 A * | 3/1998 | Spakowski et al. | ........ | 188/266.6 |
| 5,975,480 A * | 11/1999 | Schaefer et al. | .............. | 248/678 |
| 6,260,835 B1 * | 7/2001 | Angles et al. | .................. | 267/220 |
| 6,283,259 B1 * | 9/2001 | Nakadate | .................. | 188/322.2 |
| 6,676,119 B2 * | 1/2004 | Becker et al. | .................. | 267/218 |
| 6,926,431 B1 * | 8/2005 | Foote et al. | .................... | 362/494 |
| 7,445,092 B2 * | 11/2008 | Tachiiri et al. | ................. | 188/2 D |
| 2002/0030311 A1 * | 3/2002 | Beck et al. | .................. | 267/64.11 |
| 2007/0120302 A1 * | 5/2007 | Abe | .............................. | 267/195 |

FOREIGN PATENT DOCUMENTS

| | | |
|---|---|---|
| DE | 195 10 032 A1 | 9/1996 |
| EP | 0 542 573 A | 5/1993 |
| EP | 1 236 591 A2 | 9/2002 |
| JP | 01 026042 A | 1/1989 |
| JP | 03 281418 A | 12/1991 |
| JP | 2001-88528 | 4/2001 |
| JP | 2001 088528 | 4/2001 |
| WO | WO 2006/006847 | 1/2006 |
| WO | WO 2006/006848 | 1/2006 |

* cited by examiner

*Primary Examiner* — Bradley T King
*Assistant Examiner* — Thomas Irvin
(74) *Attorney, Agent, or Firm* — Babcock IP, PLLC

(57) ABSTRACT

In a suspension spring adjusting apparatus of a hydraulic shock absorber, a mounting structure of a motor to a spring adjusting case is constituted by a three-point support structure in a plan view including a motor shaft of the motor.

7 Claims, 19 Drawing Sheets

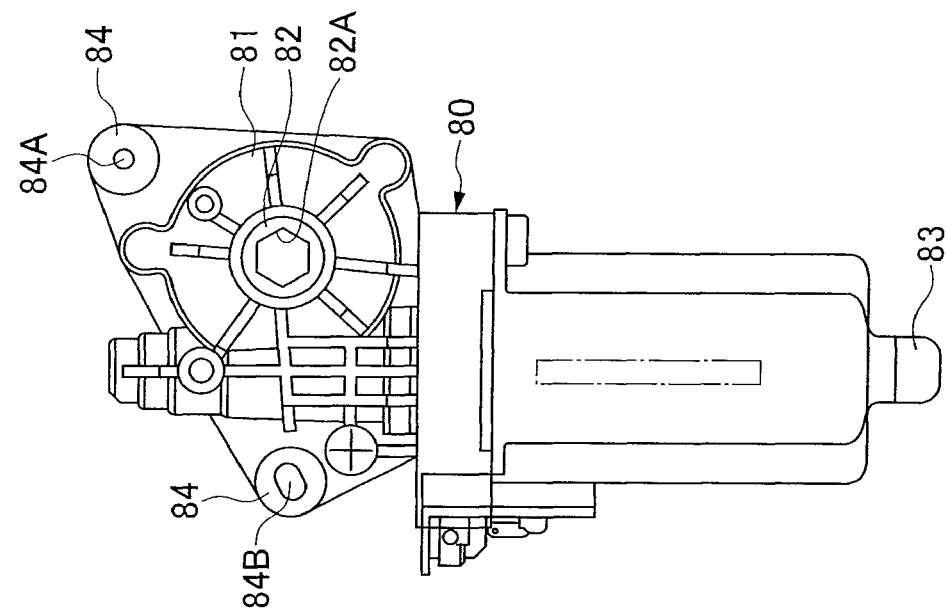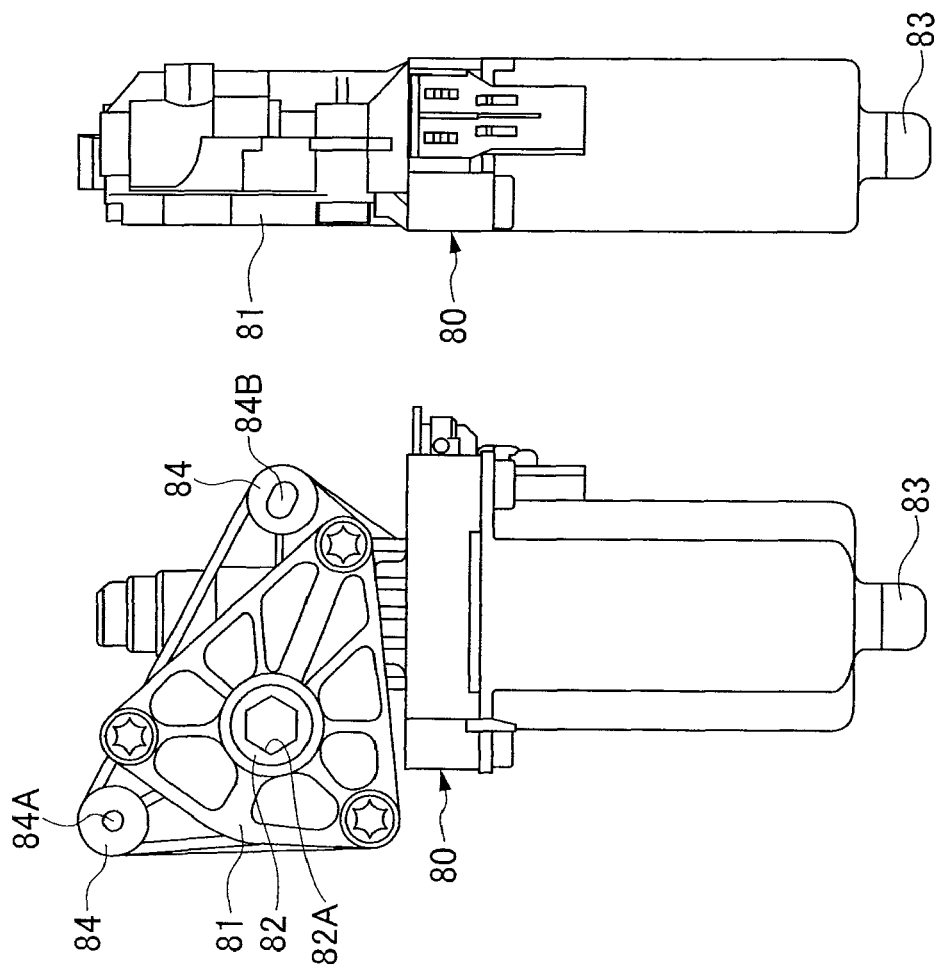

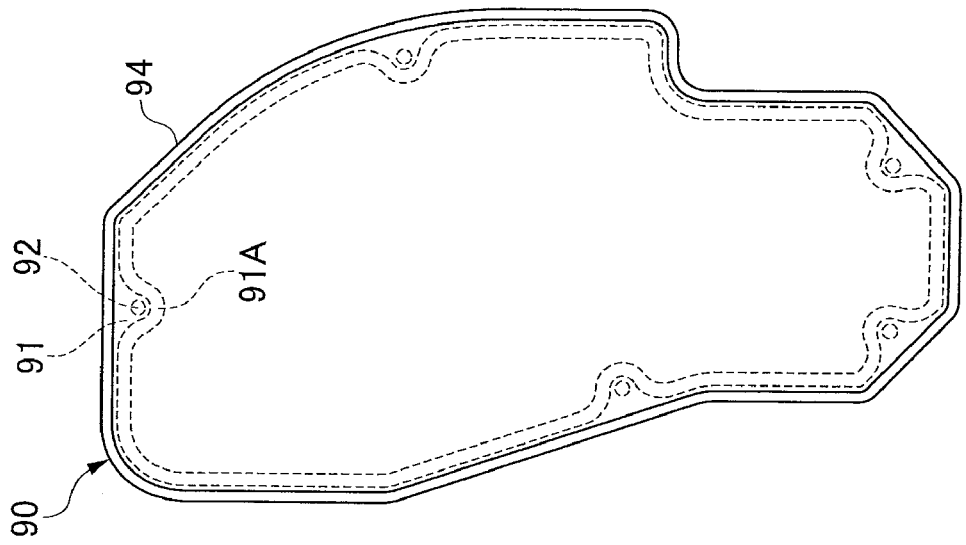
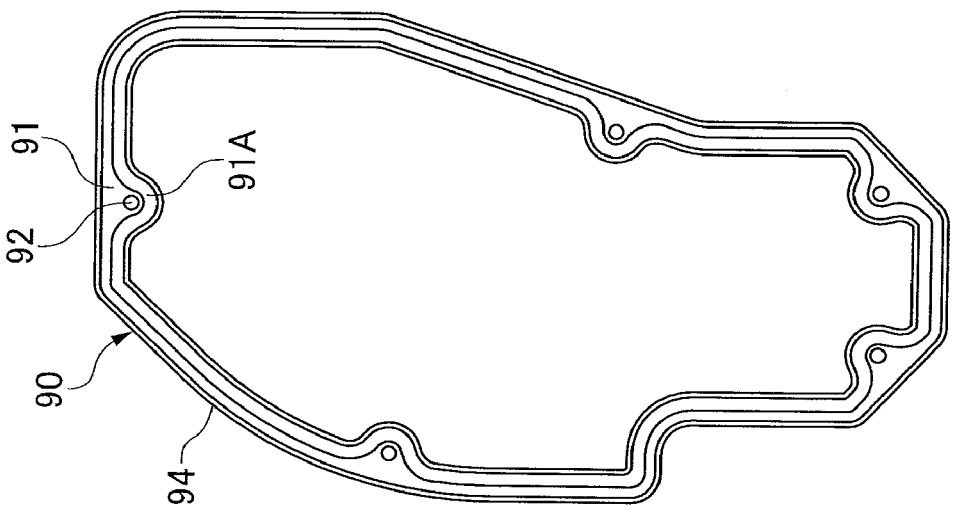
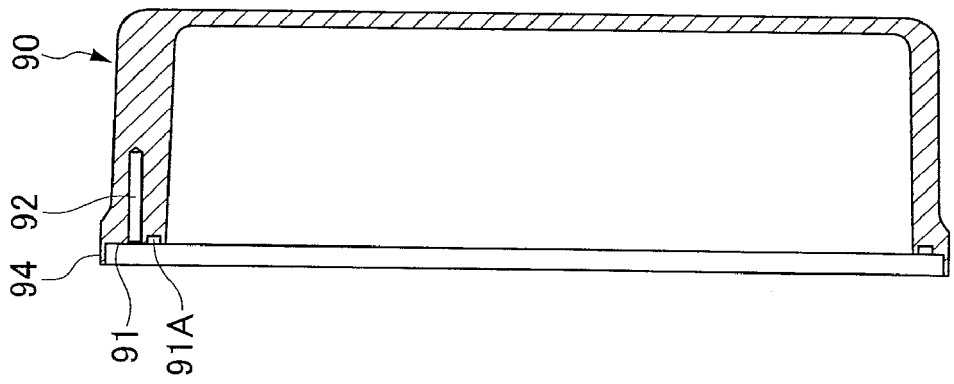

SUSPENSION SPRING ADJUSTING APPARATUS OF HYDRAULIC SHOCK ABSORBER

BACKGROUND OF THE INVENTION

1. Field of the Invention

The present invention relates to a suspension spring adjusting apparatus of a hydraulic shock absorber.

2. Description of the Related Art

Conventionally, as a suspension spring adjusting apparatus of a hydraulic shock absorber, there is a structure in which a piston rod is inserted to a cylinder. A spring adjusting jack is provided in an outer periphery of the cylinder, a jack chamber is provided in a spring adjusting case in which the spring adjusting jack is fixed to an outer periphery of the cylinder, a plunger is provided in the jack chamber. A pump supplying a hydraulic pressure to the jack chamber is installed in the spring adjusting case. A motor driving the pump is provided in the spring adjusting case, the motor is covered by a case cover attached to the spring adjusting case. A suspension spring is interposed between a spring receiver supported to the plunger of the spring adjusting jack and a spring receiver provided in a piston rod side.

Alternatively, Japanese Patent Application Laid-open No. 2001-88528 (patent document 1), discloses a motor mounting structure in a pressure oil supply and discharge apparatus of a vehicle height adjusting apparatus, wherein there is a structure in which one end flange portion extending in an axial direction of a motor is fixed to a gear housing by a plurality of bolts.

In the suspension spring adjusting apparatus of the hydraulic shock absorber, in the case that the structure described in the patent document 1 is employed as the motor mounting structure to the spring adjusting case, the motor is supported in a cantilever manner in a plan view including the motor shaft. Accordingly, a bending stress generated in the motor mounting portion tends to become excessive, and it is necessary that great strength is provided in the motor mounting portion.

SUMMARY OF THE INVENTION

An object of the present invention is to reduce a strength required for a mounting portion of a motor to a spring adjusting case, in a suspension spring adjusting apparatus of a hydraulic shock absorber.

The present invention relates to a suspension spring adjusting apparatus of a hydraulic shock absorber comprising: a piston rod inserted to a cylinder; a spring adjusting jack provided in an outer periphery of the cylinder; a jack chamber provided in a spring adjusting case in which the spring adjusting jack is fixed to the outer periphery of the cylinder, wherein a plunger is provided in the jack chamber, a pump supplying a hydraulic pressure to the jack chamber is installed in the spring adjusting case, a motor driving the pump is provided in the spring adjusting case, and the motor is covered by a case cover attached to the spring adjusting case; and a suspension spring interposed between a spring receiver supported by the plunger of the spring adjusting jack and a spring receiver provided on a side of the piston rod. A mounting structure of the motor to the spring adjusting case is constituted by a three-point support structure in a plan view including a motor shaft of the motor.

BRIEF DESCRIPTION OF THE DRAWINGS

The present invention will be more fully understood from the detailed description given below and from the accompanying drawings which should not be taken to be a limitation on the invention, but are for explanation and understanding only.

The drawings:

FIGS. 7A to 7C show a motor, in which FIG. 7A is a front elevational view, FIG. 7B is a side elevational view and FIG. 7C is a back elevational view;

FIGS. 11A to 11C show a case cover, in which FIG. 11A is a cross sectional view, FIG. 11B is a front elevational view and FIG. 11C is a back elevational view;

FIGS. 20A to 20C show a mounting stay, in which FIG. 20A is a cross sectional view, FIG. 20B is a side elevational view and FIG. 20C is a plan view; and FIGS. 21A and 21B show a mounting holder, in which FIG. 21A is a cross sectional view and FIG. 21B is a side elevational view.

DESCRIPTION OF THE PREFERRED EMBODIMENTS

Figure 1:
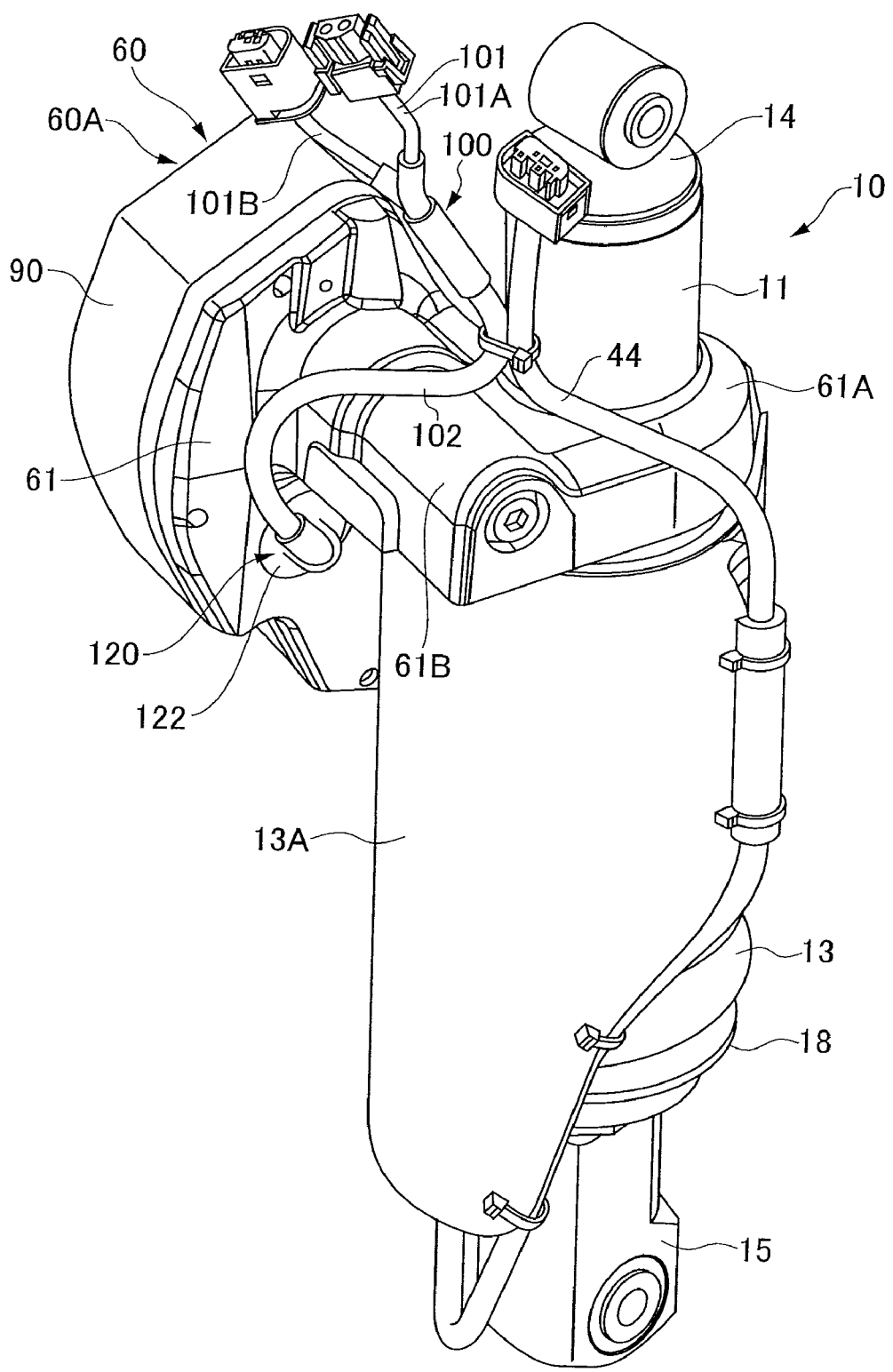
FIG. 1 is a perspective view showing a hydraulic shock absorber.
Figure 2:
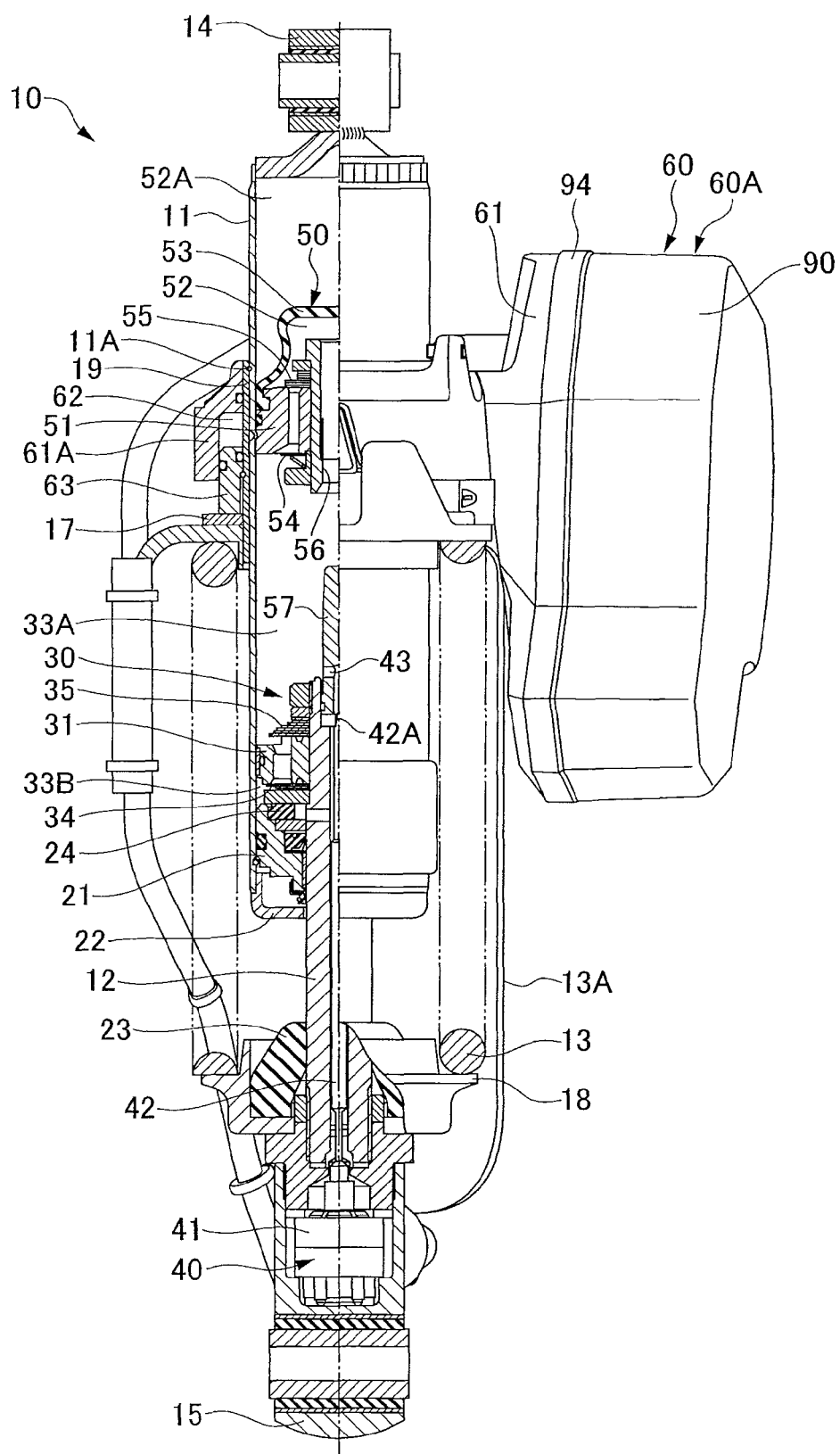
FIG. 2 is a cross sectional view showing the hydraulic shock absorber.

A hydraulic shock absorber 10 is structured, as shown in FIGS. 1 and 2, such that a hollow piston rod 12 is inserted to a cylinder 11, and a suspension spring 13 is interposed in outer side portions of the cylinder 11 and the piston rod 12.

The cylinder 11 is provided with a vehicle body side mounting member 14, and the piston rod 12 is provided with an axle side mounting member 15. A spring adjusting jack 60A of a suspension spring adjusting apparatus 60 in detail mentioned below is provided in an outer peripheral portion of the cylinder 11, and a spring receiver 17 is supported thereto. A spring receiver 18 is fixed to the axle side mounting member 15 in the piston rod 12, the suspension spring 13 is interposed between the spring receiver 17 and the spring receiver 18, and a set length of the suspension spring 13 can be adjusted by the spring adjusting jack 60A. An elastic force of the suspension spring 13 absorbs an impact force which a vehicle receives from a road surface. Reference symbol 13A denotes a spring cover.

The cylinder 11 is provided with a rod guide 21 through which the piston rod 12 passes. In this case, the cylinder 11 is provided with a bump stopper cap 22 in an outer side of the rod guide 21, and it is possible to regulate a maximum compressive stroke by bringing the bump stopper cap 22 into collision with a bump rubber 23 provided in the piston rod 12, at a time of peak compression. Further, the cylinder 11 is provided with a rebound rubber 24 in an inner side of the rod guide 21.

The hydraulic shock absorber 10 has a piston valve apparatus (a compression side and expansion side damping force generating apparatus) 30. The hydraulic shock absorber 10 suppresses an expanding and contracting vibration of the cylinder 11 and the piston rod 12 in accordance with an absorption of an impact force by the suspension spring 13, on the basis of a damping force generated by the piston valve apparatus 30.

The piston valve apparatus 30 is structured such that a piston 31 is fixed to an end portion of the piston rod 12, an inner portion of the cylinder 11 is sectioned to a piston side oil chamber 33A in which the piston rod 12 is not accommodated, and a rod side oil chamber 33B in which the piston rod 12 is accommodated, and a disc-like compression side damping valve 34 and a disc-like expansion side damping valve 35 are respectively provided in a compression side oil path and an expansion side oil path communicating between the piston side oil chamber 33A and the rod side oil chamber 33B provided in the piston 31.

The piston valve apparatus 30 has a damping force adjusting apparatus 40. The damping force adjusting apparatus 40 can adjust an expansion side damping force by moving forward and backward an adjusting rod 42 inserted to a hollow portion of the piston rod 12 by means of a motor 41 installed in the axle side mounting member 15, and adjusting an opening area of a bypass oil path 43 provided in the hollow portion of the piston rod 12 in such a manner as to communicate the piston side oil chamber 33A with the rod side oil chamber 33B by means of a leading end needle valve 42A of the adjusting rod 42.

The hydraulic shock absorber 10 has a base valve apparatus (a compression side damping force generating apparatus) 50. The base valve apparatus 50 is provided with a partition wall member 51 in an inner portion of the cylinder 11, is provided with a reservoir chamber 52 sectioned from the piston side oil chamber 33A by the partition wall member 51, and defines a gas chamber 52A at the back of the reservoir chamber 52 by means of a rubber-like diaphragm 53 fitted to an outer periphery in a side of the reservoir chamber 52 of the partition wall member 51. The base valve apparatus 50 is provided with a disc-like expansion side damping valve (a check valve) 54 and a disc-like compression side damping valve 55 respectively in an expansion side oil path and a compression side oil path communicating between the piston side oil chamber 33A and the reservoir chamber 52 provided in the partition wall member 51.

In order to apply a position dependency to the compression side damping force by the compression side damping valve 55 of the base valve apparatus 50, the hydraulic shock absorber 10 is provided with a communication path 56 communicating the piston side oil chamber 33A with the reservoir chamber 52 in the partition wall member 51, and is provided with a control rod 57 fitting the piston rod 12 to the communication path 56 via a small gap after compressing the piston rod 12 at a fixed stroke in the piston rod 12.

Accordingly, a damping operation of the hydraulic shock absorber 10 is as follows.

(Compressing Time)

(a) When a moving speed of the piston rod 12 is low, the oil in the piston side oil chamber 33A moves to the rod side oil chamber 33B via a bypass oil path 43 of the piston rod 12, and the compression side damping force is obtained on the basis of a throttle resistance generated by the needle valve 42A during this time.

(b) When the moving speed of the piston rod 12 is middle or high, in a small stroke stage in which the control rod 57 is not yet fitted to the communication path 56, in addition to the damping force in the item (a) mentioned above, the oil in the piston side oil chamber 33A moves to the rod side oil chamber 33B through the compression side oil path of the piston 31, and the compression side damping force is obtained by a deflecting deformation of the compression side valve 34 during this time.

(c) When the moving speed of the piston rod 12 is middle or high, in a large stroke stage in which the control rod 57 is fitted to the communication path 56, in addition to the damping forces in the items (a) and (b) mentioned above, the oil in the piston side oil chamber 33A moves to the reservoir chamber 52 through the compression side oil path of the partition wall member 51, and the compression side damping force is obtained by a deflecting deformation of the compression side valve 55 during this time.

In this case, in the items (a) to (c) mentioned above, the oil at a volumetric capacity at which the piston rod 12 moves forward into the cylinder 11 is extruded to the reservoir chamber 52 from the piston side oil chamber 33A through the communication path 56 or the oil path of the partition wall member 51 so as to be compensated.

(Expanding Time)

(a) When the moving speed of the piston rod 12 is low, the oil in the rod side oil chamber 33B moves to the piston side oil chamber 33A from the bypass oil path 43 of the piston rod 12, and the expansion side damping force is obtained on the basis of a throttle resistance generated by the needle valve 42A during this time.

(b) When the moving speed of the piston rod 12 is middle or high, in addition to the damping force in the item (a) mentioned above, the oil in the rod side oil chamber 33B moves to the piston side oil chamber 33A through the expansion side oil path of the piston 31, and the expansion side damping force is obtained by a deflecting deformation of the expansion side valve 35 during this time.

In this case, in the items (a) and (b) mentioned above, the oil at a volumetric capacity at which the piston rod 12 moves backward from the cylinder 11 is returned to the piston side oil chamber 33A through the oil path of the partition wall member 51 or the communication path 56 from the reservoir 52 so as to be compensated.

A description will be given below of a suspension spring adjusting apparatus 60 of the hydraulic shock absorber 10. The suspension spring adjusting apparatus 60 is provided with a spring adjusting jack 60A in an outer periphery of the cylinder 11, as shown in FIGS. 1 to 6. The spring adjusting jack 60A is structured such that a jack chamber 62 is provided in a spring adjusting case 61 fixed to the outer periphery of the cylinder 11. A plunger 63 is slidably provided in the jack chamber 62, a pump 70 supplying a hydraulic pressure to the jack chamber 62 is installed in the spring adjusting case 61, a motor 80 driving the pump 70 is provided in the spring adjusting case 61, and the motor 80 is covered by a case cover 90 attached to the spring adjusting case 61. Further, as mentioned above, the suspension spring 13 is interposed between the spring receiver 17 supported to the plunger 63 of the spring adjusting jack 60A and the spring receiver 18 provided in the side of the piston rod 12, and a spring force of the suspension spring 13 can be adjusted by adjusting a set length of the suspension spring 13 on the basis of a vertical movement of the plunger 63 and the spring receiver 17 by means of the spring adjusting jack 60A.

Figure 3:
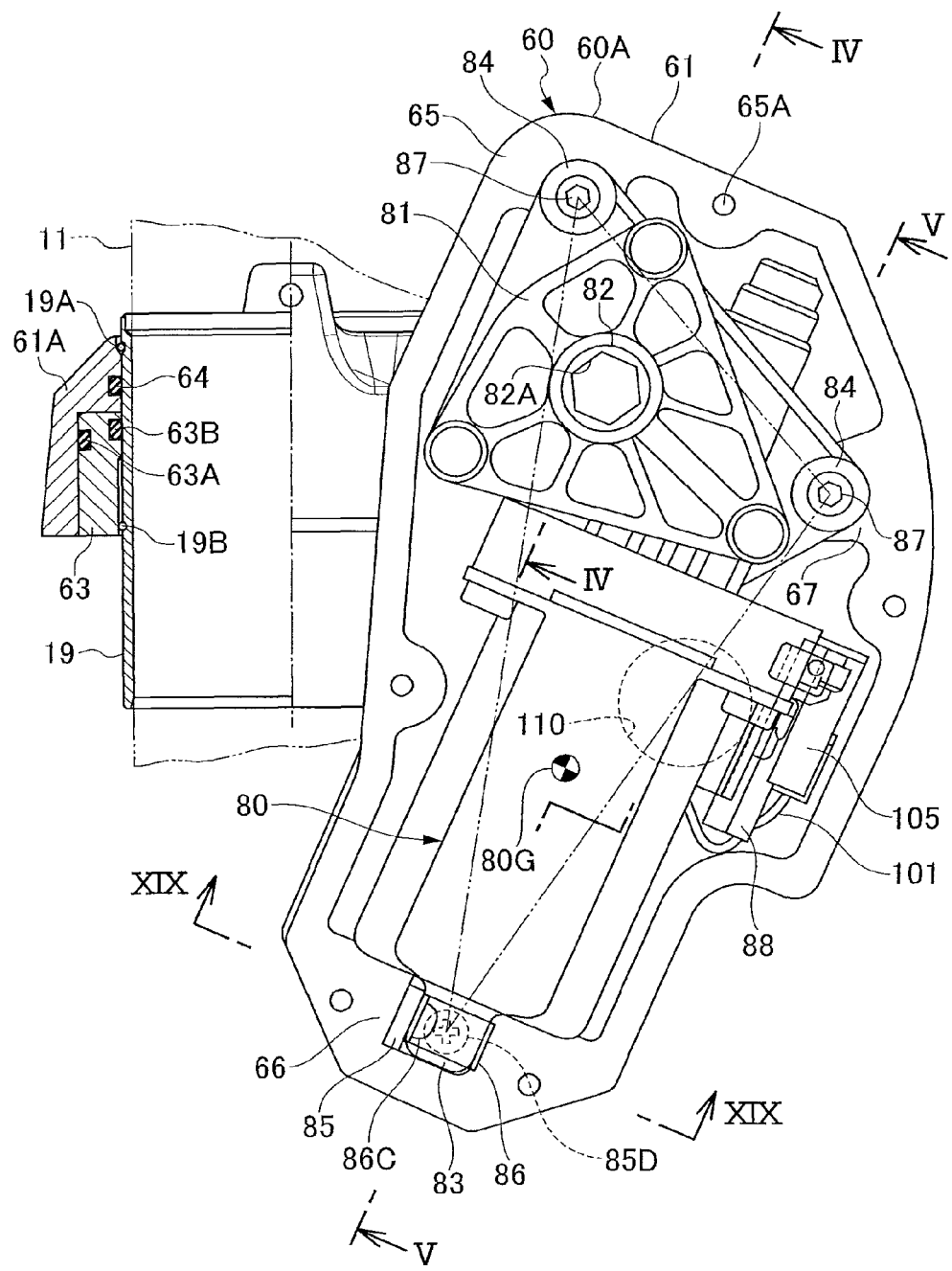
FIG. 3 is a front elevational view showing a motor mounting state to a spring adjusting case.

The spring adjusting jack 60A is structured, as shown in FIGS. 2 and 3, such that the sleeve 19 is fitted to an outer periphery of the cylinder 11, and is locked in an axial direction by a stop ring 11A (FIG. 2). The jack housing 61A of the spring adjusting case 61 is inserted and attached to the sleeve 19 via an O-ring 64, and is locked in an axial direction by a stop ring 19A (FIG. 3). The plunger 63 is slidably fitted to the jack chamber 62 between the sleeve 19 and the jack housing 61A via O-rings 63A and 63B (FIG. 3). Reference symbol 19B (FIG. 3) denotes a slidable end regulating stop ring of the plunger 63. The spring adjusting jack 60A is structured by uniting a structure provided with the spring receiver 17 in the plunger 63.

Figure 4:
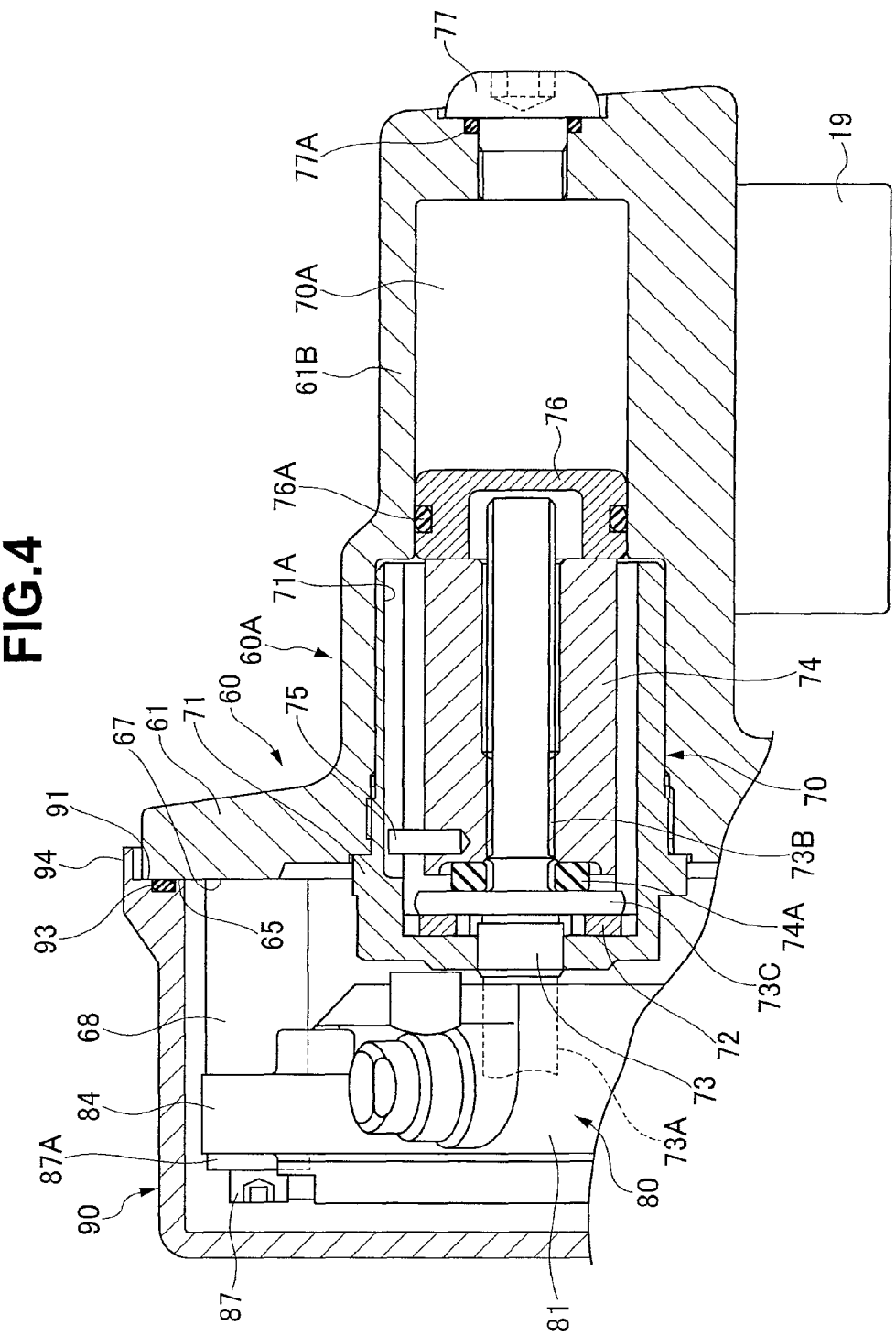
FIG. 4 is a cross sectional view along a line IV-IV in FIG. 3.
Figure 8:
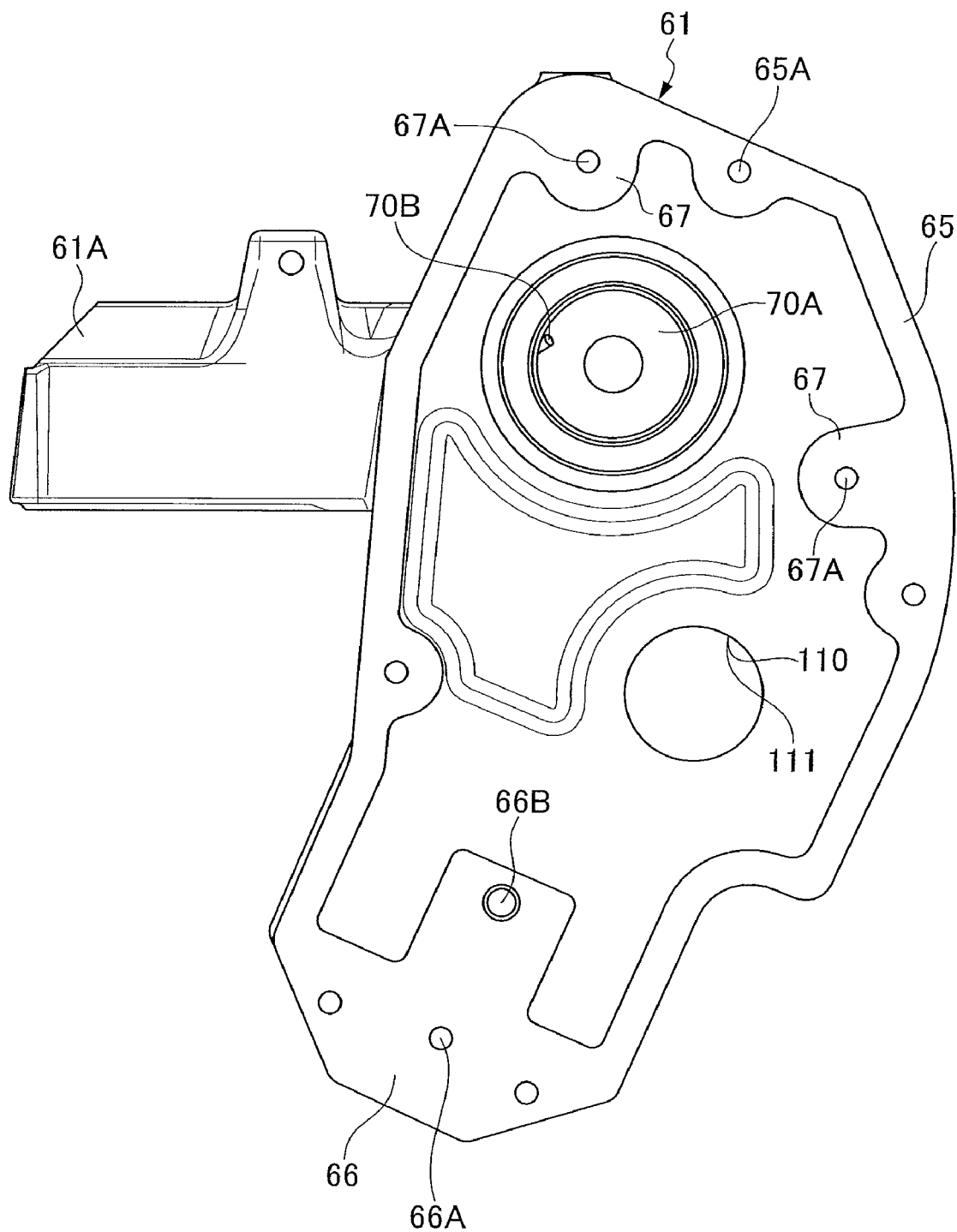
FIG. 8 is a front elevational view showing the spring adjusting case.
Figure 9:
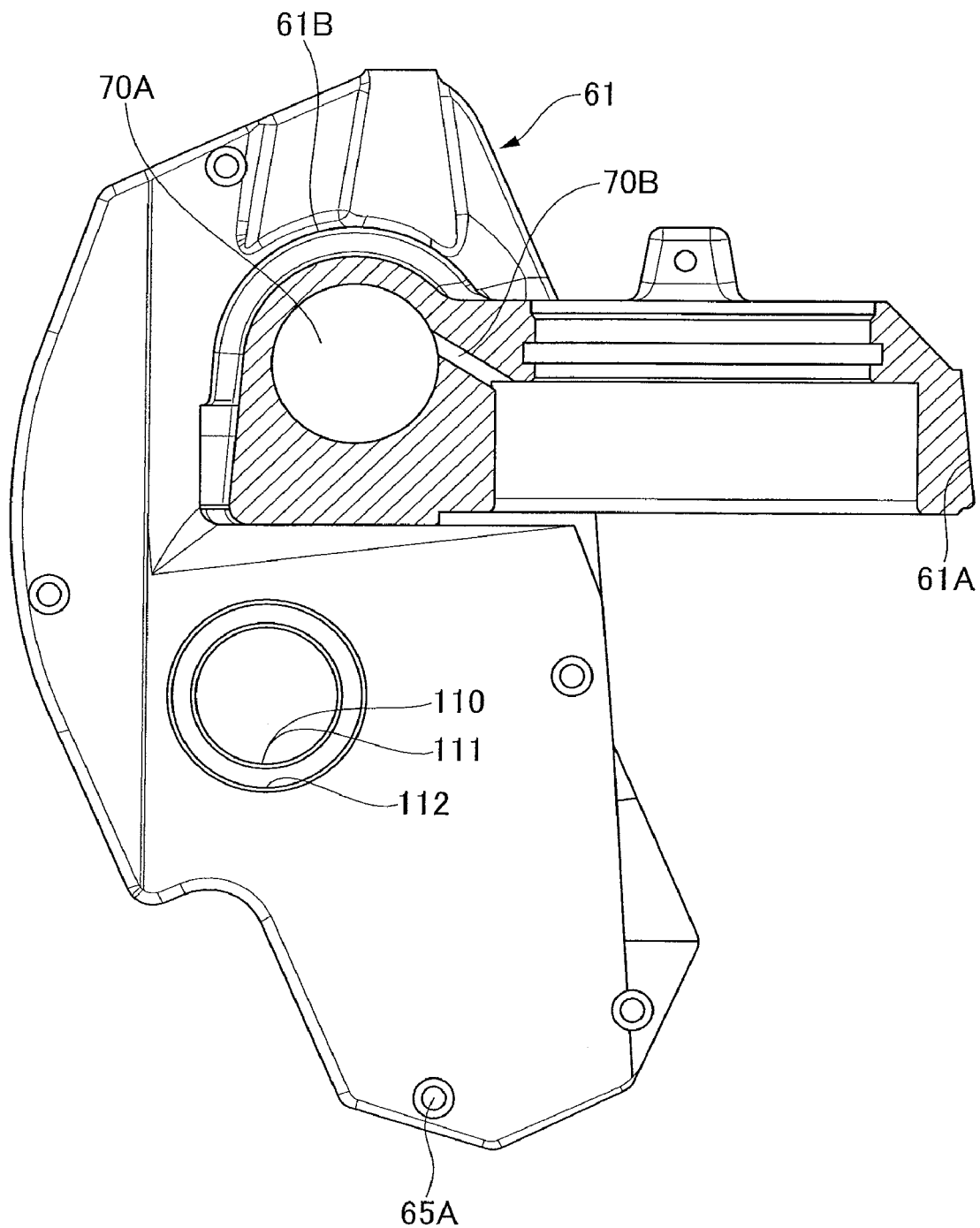
FIG. 9 is a cross sectional view showing a communication between a jack chamber of the spring adjusting case and a pump chamber.
Figure 10:
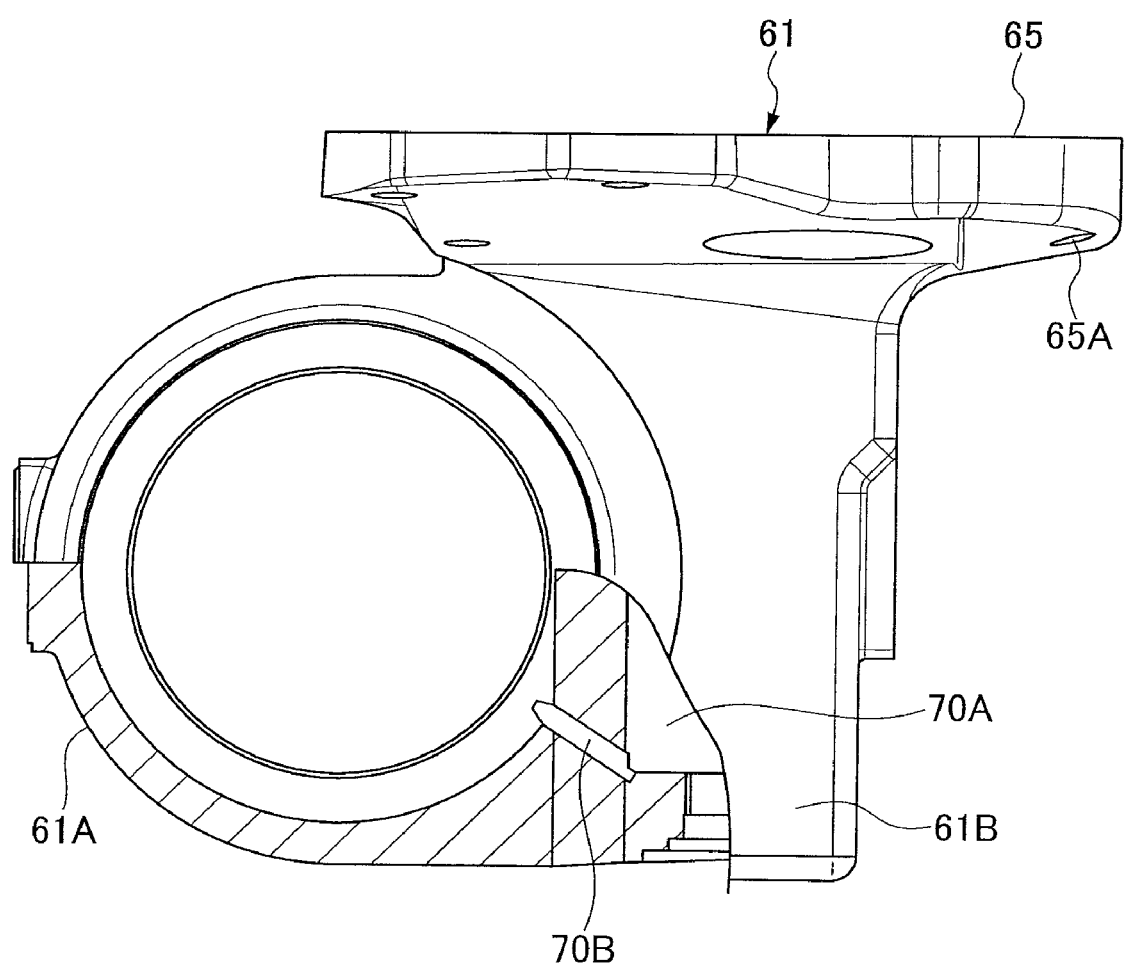
FIG. 10 is a cross sectional view showing the spring adjusting case.
Figure 12:
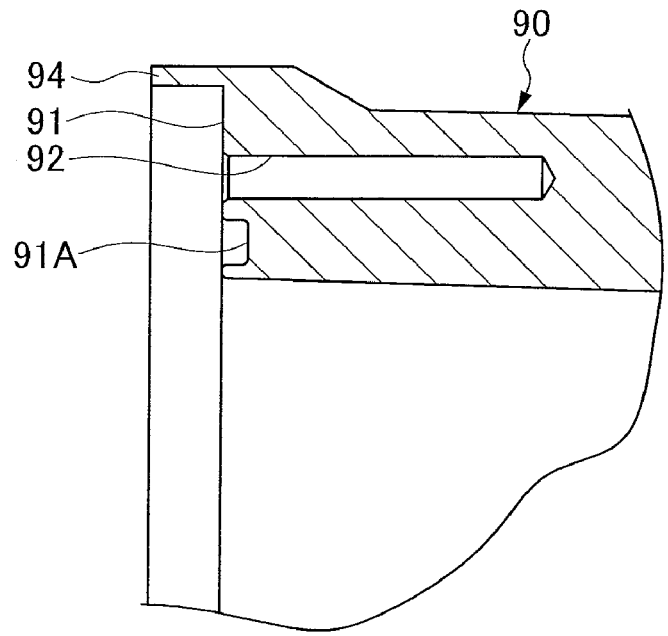
FIG. 12 is an enlarged cross sectional view showing a skirt portion of the case cover.
Figure 14:
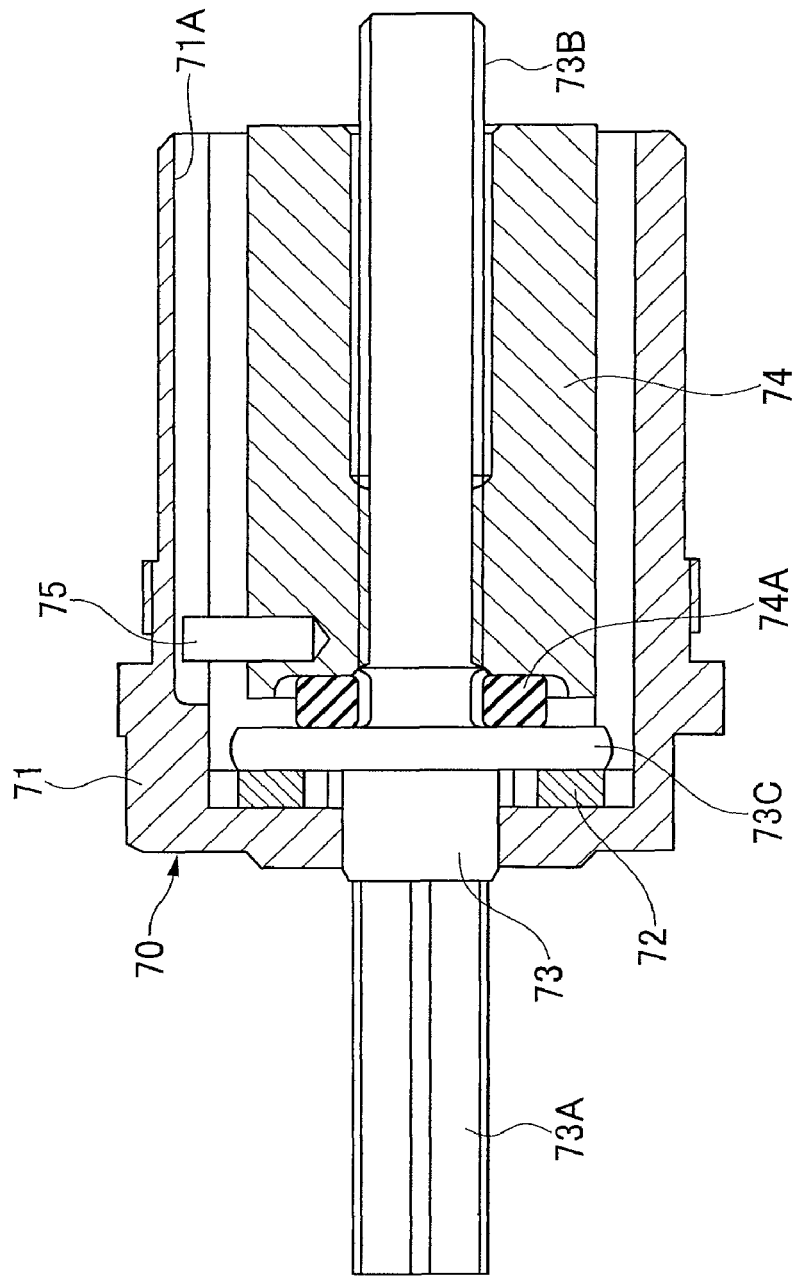
FIG. 14 is a cross sectional view showing a pump.

The spring adjusting jack 60A has a pump 70 built-in the pump housing 61B of the spring adjusting case 61, as shown in FIG. 4. The pump 70 is structured, as shown in FIGS. 4 and 14, such that a tubular holder 71 is fixed to the pump housing 61B in accordance with a screwing, and a drive shaft 73 is supported by a thrust bearing 72 provided in the holder 71. One end of the drive shaft 73 is formed as a hexagonal shaft 73A coupled to the motor 80, and a leveling nut 74 is screwed to the other end thread shaft 73B in such a manner as to pinch a rebound rubber 74A with respect to a flange 73C. A pin 75 is implanted in an outer periphery of the nut 74, and the pin 75 is locked into a linear guide groove 71A provided in an axial direction of an inner surface of the holder 71. A leveling piston 76 is slidably inserted to the pump chamber 70A of the pump housing 61B via an O-ring 76A, and the piston 76 is brought into collision with a leading end surface of the nut 74 so as to be supported by a back surface. In the spring adjusting case 61, the jack chamber 62 within the jack housing 61A and the pump chamber 70A within the pump housing 61B are communicated by a communication path 70B as shown in FIGS. 8 to 10. In FIG. 4, reference numeral 77 denotes a plug, and reference symbol 77A denotes an O-ring. Accordingly, when the motor 80 rotates forward and backward the drive shaft 73 of the pump 70, the pin 75 of the leveling nut 74 engaged with the drive shaft 73 is guided by the guide groove 71A of the holder 71 so as to linearly reciprocate the nut 74, and the leveling piston 76 to which the nut 74 is supported by the back surface moves forward and backward within the pump chamber 70A. As a result, the oil within the pump chamber 70A is supplied and discharged to the jack chamber 62 of the spring adjusting jack 60A via the communication path 70B, and vertically moves the plunger 63 of the jack 60A and the spring receiver 17 by extension.

The spring adjusting jack 60A attaches the motor driving the pump 70 within a profile of a mounting mating surface 65 to the case cover 90 in the spring adjusting case 61. The motor 80 is structured, as shown in FIGS. 7A to 7C, such that a speed reducer 81 is integrally provided in a leading end side, and the hexagonal shaft 73A of the drive shaft 73 of the pump 70 is fitted and coupled to a hexagonal hole 82A provided in an output shaft 82 of the speed reducer 81.

Figure 5:
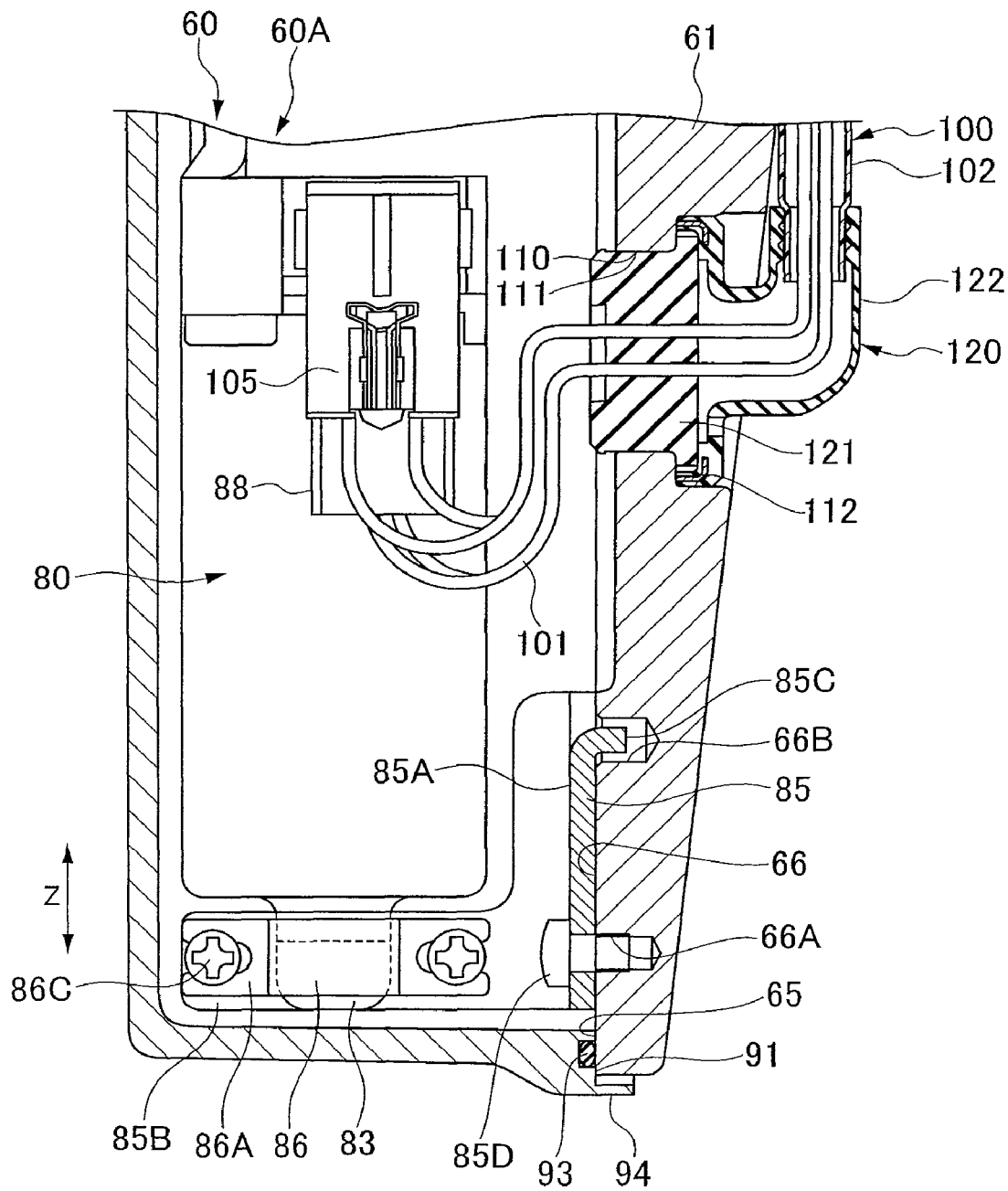
FIG. 5 is a cross sectional view schematically showing a cross section along a line V-V in FIG. 3.
Figure 6:
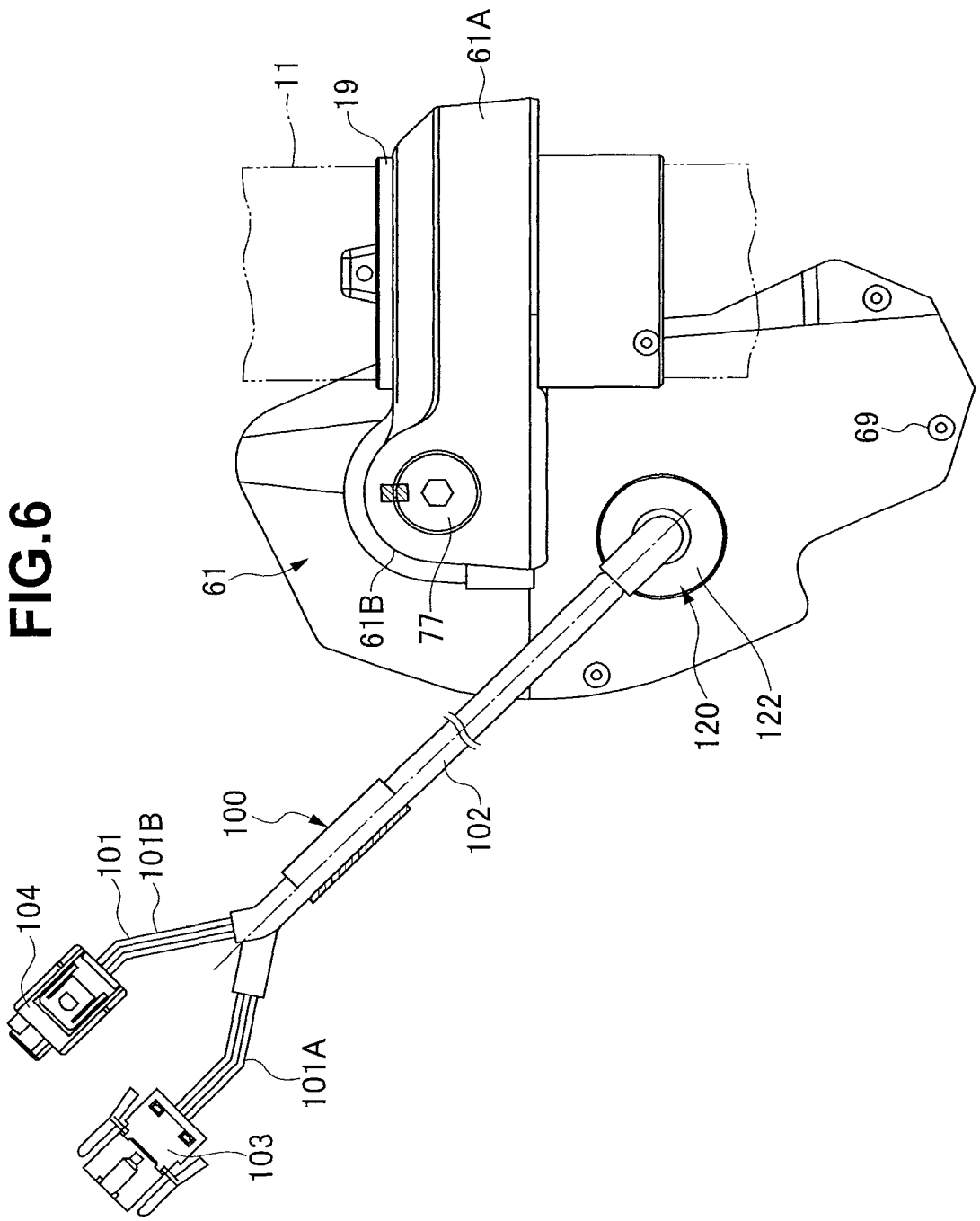
FIG. 6 is a back elevational view showing the spring adjusting case.

The spring adjusting jack 60A is structured, as shown in FIGS. 2, 4 and 5, such that the motor 80 is covered by a closed-end case cover 90 attached to the spring adjusting case 61. A mounting mating surface 91 is aligned with a mounting mating surface 65 of the spring adjusting case 61, and a mounting screw 69 inserted to a mounting hole 65A (FIGS. 8 to 10) formed so as to pass through an external portion at five points in the mounting mating surface 65 of the spring adjusting case 61 is fixed to a mounting hole 92 (FIGS. 11A to 11C) provided in correspondence to the mounting mating surface 91 of the case cover 90, as shown in FIGS. 3 and 6.

Figure 15:
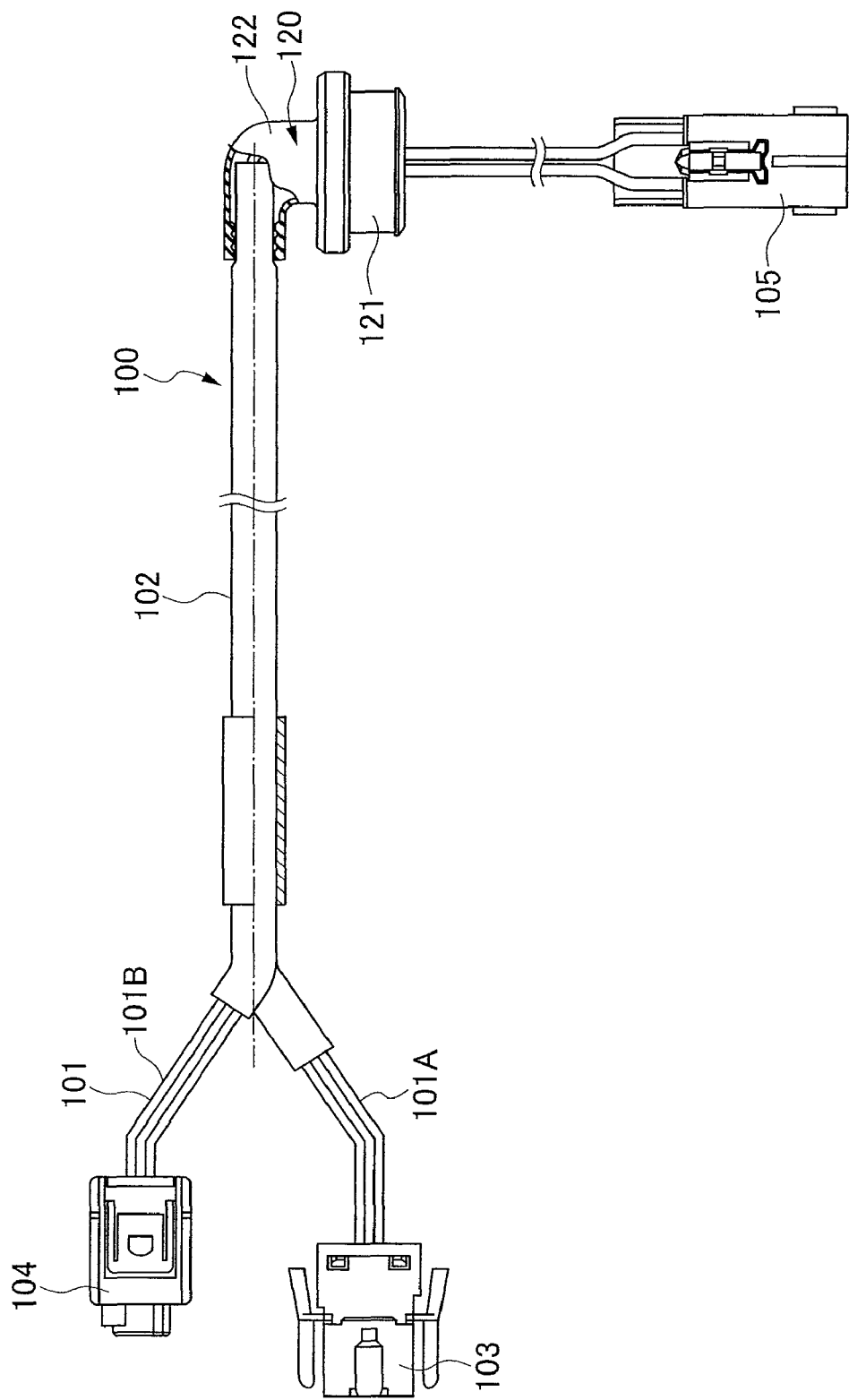
FIG. 15 is a plan view showing a harness assembly.

In the spring adjusting jack 60A, as shown in FIGS. 1 and 2, a plurality of harnesses 101 (a harness 101A for feeding power and a harness 101B for sensor) such as a feeder line, a signal line or the like connected to a control portion of the power source and the hydraulic shock absorber 10 are inserted to an inner portion of the spring adjusting case 61 from a harness insertion hole 110 provided in the spring adjusting case 61 so as to be connected to a socket 88 of the motor 80. A plurality of harnesses 101 structure a harness assembly 100 as shown in FIG. 15, and the harnesses 101 are coated by a single tube 102 so as to be united into one bundle. In FIG. 15, reference numerals 103 and 104 denote a vehicle body side connecting socket previously fixed by caulking to one end side of the harness 101, and reference numeral 105 denotes a socket previously fixed to the other end side of the harness 101 so as to be connectable to the socket 88 of the motor 80. In this case, a harness 44 connected to the motor 41 of the damping force adjusting apparatus 40 is extended to inner and outer sides of the axle side mounting bracket 15.

Accordingly, in the spring adjusting jack 60A of the suspension spring adjusting apparatus 60, (A) a mounting structure between the spring adjusting case 61 and the case cover 90, (B) a waterproof seal structure between the spring adjusting case 61 and the case cover 90, (C) a harness insertion structure of the spring adjusting case 61, and (D) a mounting structure of the motor 80 are made as follows.

(A) Mounting Structure Between Spring Adjusting Case 61 and Case Cover 90 (FIGS. 11A to 11C and 12)

The spring adjusting jack 60A is structured such that when aligning the mounting mating surface 91 with the mounting mating surface 65 of the spring adjusting case 61 and fixing them by the mounting screw 69, the mounting mating surfaces 65 and 91 are sealed by an endless circumferential seal member 93 as shown in FIGS. 4 and 5, and the mounting screw 69 of the spring adjusting case 61 and the case cover 90 is arranged closer to an outer side of the case cover 90 than the seal member 93. The seal member 93 is loaded to an endless circumferential seal loading groove 91A extending along a profile of the mounting mating surface 91 within a surface of the mounting mating surface 91 of the case cover 90, and is compressed with respect to the mounting mating surface 65 of the spring adjusting case 61. The case cover 90 is structured such that the mounting mating surface 91 around the mounting hole 92 for the mounting screw 69 is formed so as to protrude to an inner side of the cover 90, and the circular arc-shaped seal loading groove 91A surrounding the mounting hole 92 is provided in the protruding portion of the mounting mating surface 91, and the circular arc-shaped seal loading groove 91A is smoothly connected to the seal loading groove 91A provided in the other portion of the mounting mating surface 91.

In this case, the harness 101 connected to the motor 80 is inserted to the harness insertion hole 110 of the spring adjusting case 61 via a seal means 120 in detail mentioned below.

In accordance with the present embodiment, the following operation and effect can be achieved.

(a) The spring adjusting case 61 and the mounting mating surfaces 65 and 91 of the case cover 90 are sealed by the endless circumferential seal member 93, and the mounting screw 69 of the spring adjusting case 61 and the case cover 90 is arranged closer to the outer side of the case cover than to the seal member 93. Accordingly, the mounting screw 69 does not require a seal treatment such as a potting seal, a packing or the like, there is no risk that an inferior quality is generated by a seal treatment miss, and an internal portion of the case cover 90 is sealed by the seal member 93 so as to be waterproofed.

(b) Although the spring adjusting case 61 is provided with the harness insertion hole 110 through which the harness 101 connected to the motor 80 passes, the harness 101 is inserted to the harness insertion hole 110 via the seal means 120 so as to be waterproofed.

(B) Waterproof Seal Structure of Spring Adjusting Case 61 and Case Cover 90 (FIGS. 4, 5 and 11A to 13)

Figure 13:
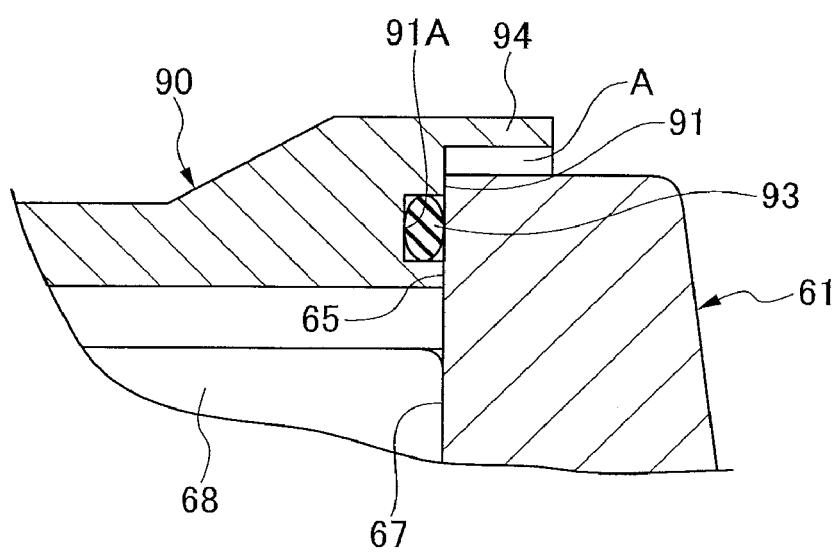
FIG. 13 is a cross sectional view showing a mounting structure of the spring adjusting case and the case cover.

The spring adjusting jack 60A is structured, as shown in FIGS. 4, 5 and 13, such that the mounting mating surfaces 65 and 91 sealed by the seal member 93 of the spring adjusting case 61 and the case cover 90 are formed in a flat surface shape, and an annular skirt portion 94 is provided in a protruding manner in an outer peripheral edge extending over an entire periphery around the mounting mating surface 91 of the case cover 90 (FIGS. 11A to 11C and 12). The annular skirt portion 94 surrounds an outer peripheral side surface around the mounting mating surface 65 of the spring adjusting case 61 via a gap A so as to cover over.

In this case, a motor mounting seat surface 67 for a motor mounting spacer 68 provided in the spring adjusting case 61 is simultaneously worked in a flat surface shape which is flush formed with the mounting mating surface 65 for the case cover 90. The motor 80 is mounted to the mounting seat surface 67 of the spring adjusting case 61 via the spacer 68 as mentioned above. The mounting seat surface 66 for the motor mounting stay 85 provided in the spring adjusting case 61 is also simultaneously worked in a flat surface shape which is flush formed with the mounting mating surface 65 for the case cover 90.

In accordance with the present embodiment, the following operations and effects can be achieved.

(a) Since the skirt portion 94 in the outer peripheral edge of the case cover 90 covers the outer peripheral surface of the spring adjusting case 61, a high-pressure washing water is not directly applied to the outer edges of the mounting mating surfaces 65 and 91 of the spring adjusting case 61 and the case cover 90, a load of the seal member 93 against the direct intruding water is lost, and it is possible to improve a waterproof seal performance in the inner portion of the case cover 90.

(b) The skirt portion 94 in the outer peripheral edge of the case cover 90 has the gap with respect to the outer peripheral surface of the spring adjusting case 61, it is unnecessary to work the skirt portion 94 of the case cover 90 and work the outer peripheral surface of the spring adjusting case 61, and a precision for forming by a metal mold is sufficient. Accordingly, the mounting portion of the spring adjusting case 61 and the case cover 90 can be sufficiently worked by forming the mounting mating surfaces 65 and 91 thereof in the flat surface shape, it is possible to reduce the working man hour and it is easy to manage the dimension.

(c) The mounting seat surface 67 of the motor 80 provided in the spring adjusting case 61 is formed in the flat surface shape which is flush formed with the mounting mating surface 65 to the case cover 90, and the motor 80 is attached to the mounting seat surface 67 via the spacer 68. Accordingly, it is possible to simultaneously work the mounting seat surface 67 of the motor 80 provided in the spring adjusting case 61 and the mounting mating surface 65 for the case cover 90, and it is possible to reduce the working man hour.

(C) Harness Inserting Structure of Spring Adjusting Case 61 (FIGS. 5, 6, 7A to 7C and 15 to 18)

The spring adjusting jack 60A is structured, as shown in FIG. 5, such that the spring adjusting case 61 is previously provided with the harness insertion hole 110 having a larger aperture diameter than the outer size of the socket 105 in the harness assembly 100, in such a manner as to insert the socket 105 of the harness 101 to the spring adjusting case 61 under a state of being assembled in the outer periphery of the cylinder 11 from the outer side. The harness 101 of the harness assembly 100 is inserted to the harness insertion hole 110 via the seal means 120 in a watertight manner.

Figure 16:
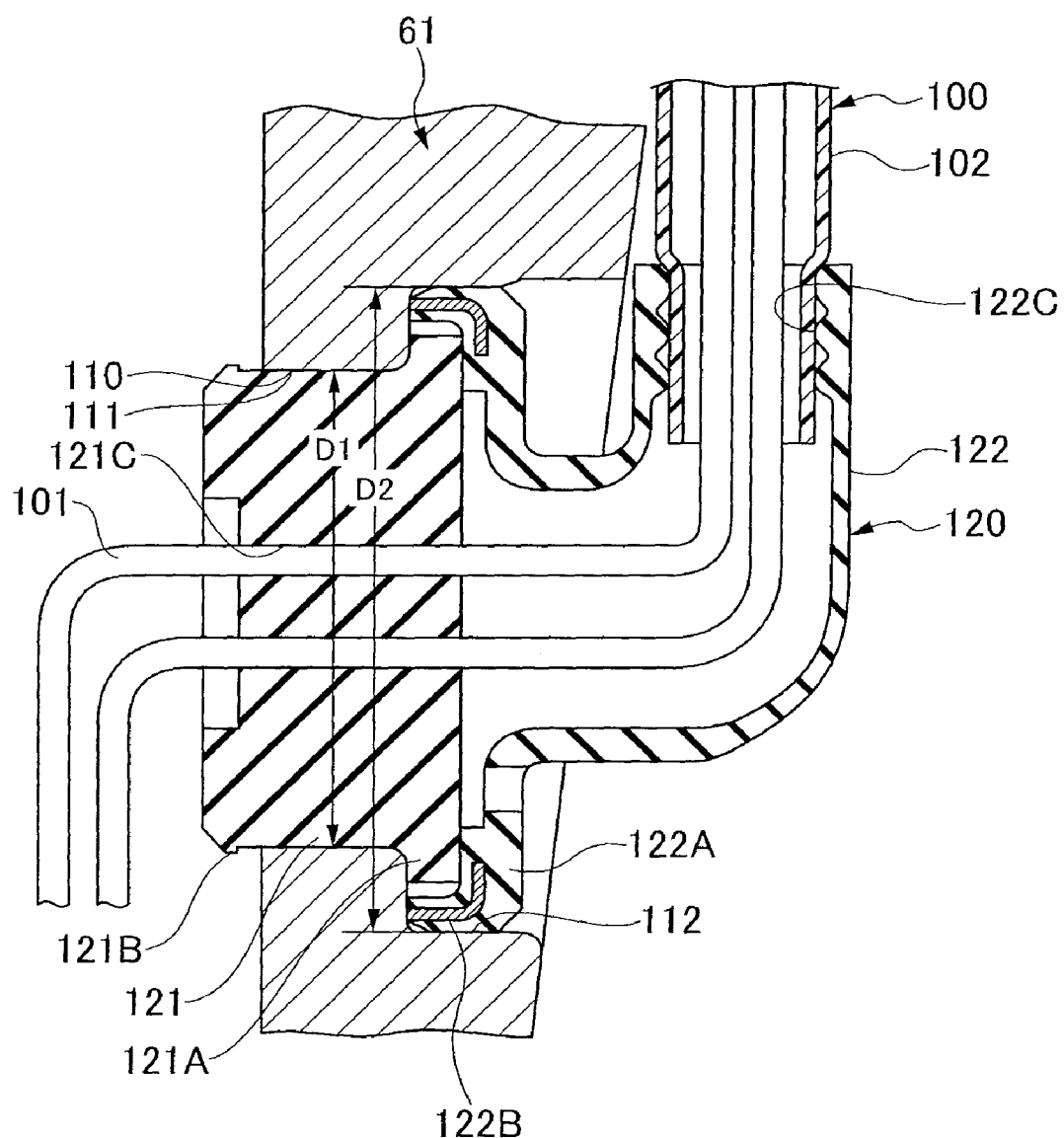
FIG. 16 is a cross sectional view showing a harness insertion structure to the spring adjusting case.

The harness insertion hole 110 provided in the spring adjusting case 61 is constituted by a two-stage hole having a first hole 111 provided in the inner surface side of the spring adjusting case 61 and facing to the inner portion of the spring adjusting case 61, and a second hole 112 provided in the outer surface side of the spring adjusting case 61 and facing to the outer portion of the spring adjusting case 61, as shown in FIG. 16. In the present embodiment, the first hole 111 and the second hole 112 are constituted by a round hole and coaxially provided. A hole diameter D2 of the second hole 112 is larger than a hole diameter D1 of the first hole 111, and the hole diameter D1 of the first hole 111 is larger than the outer size of the socket 105.

The seal means 120 is constituted by a harness guide 121 and a cap 122, as shown in FIGS. 15 and 16.

Figure 17:
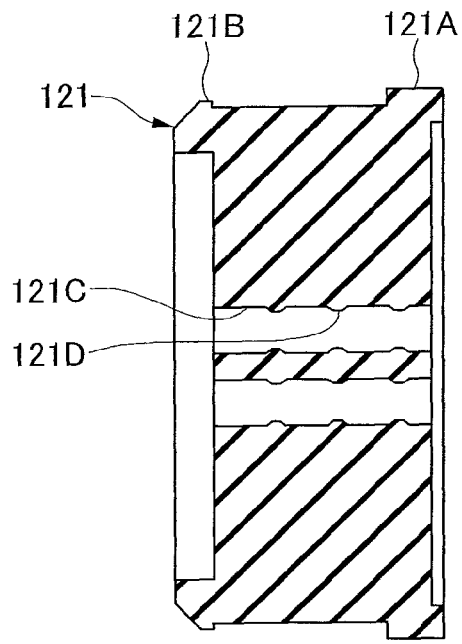
FIG. 17 is a cross sectional view showing a harness guide.

The harness guide 121 is constituted by a rubber body approximately formed in a thick disc shape, as shown in FIG. 17. The harness guide 121 is provided with a flange 121A engaging with an outer edge of an outer end of the first hole 111 of the spring adjusting case 61, and a hook 121B locking to an outer edge of an inner end of the first hole 111, and is provided with a plurality of hole-shaped harness insertion paths 121C which can insert a plurality of harnesses 101, in a penetrating manner. When pressure inserting the harness guide 121 to which the harness 101 is inserted to the first hole 111, the harness guide 121 is compressed so as to reduce a diameter of the harness insertion path 121C, and inserts the harness 101 in a watertight manner while bringing an annular crimple 121D into pressure contact with the harness 101.

Figure 18:
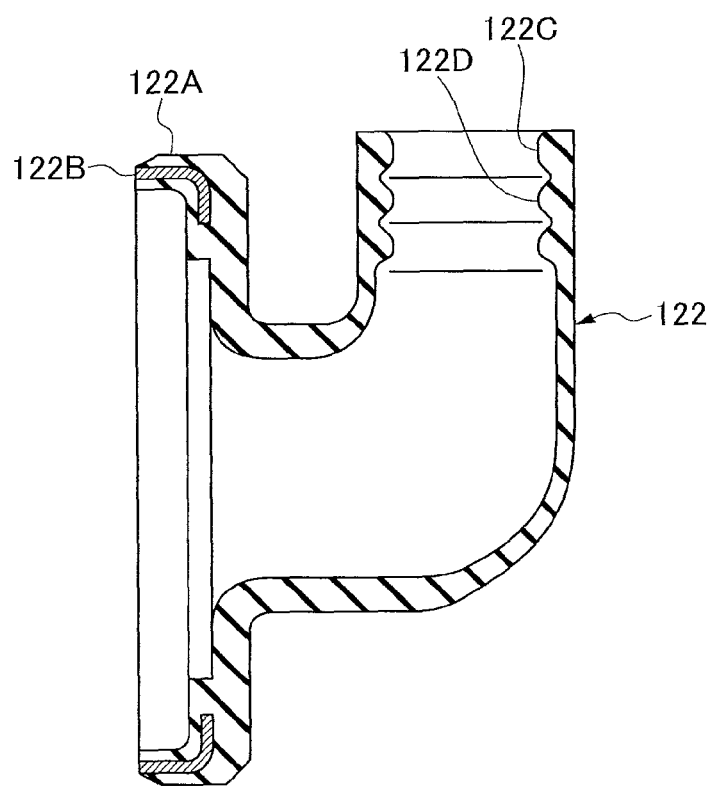
FIG. 18 is a cross sectional view showing a cap.

The cap 122 is constituted by a rubber body approximately formed in an L shape, as shown in FIG. 18. The cap 122 is provided with a flange 122A elastically locking and attaching to an inner periphery of a back end of the second hole 112 of the spring adjusting case 61 in a base end side, is provided with a core metal 122B in an inner portion of the flange 122A, and is provided with a tube insertion path 122C in a leading end portion. The tube insertion path 122C is provided with a plurality of annular crimples 122D brought into pressure contact with the outer periphery of the tube 102 of the harness assembly 100, and can pressure insert and hold one end of the tube 102 in a waterproof manner.

The harness assembly 100 is inserted and attached to the harness insertion hole 110 of the spring adjusting case 61 in the following manner.

(1) The socket 105 of the harness assembly 100 is inserted to the harness insertion hole 110 of the spring adjusting case 61 which is finished being assembled the hydraulic shock absorber 10, and is under the state of being assembled in the outer periphery of the cylinder 11, from the outer side. The socket 105 is connected to the socket 88 of the motor 80.

(2) The harness guide 121 inserted and attached to the harness 101 is pressure inserted to the first hole 111 of the harness insertion hole 110 so as to be fixed. The flange 121A of the harness guide 121 is engaged with the outer edge of the outer end of the first hole 111, and the hook 121B is locked to the outer edge of the inner end of the first hole 111.

(3) The cap 122 inserted and attached to the tube 102 is pressure inserted to the second hole 112 of the harness insertion hole 110 so as to be fixed. The flange 122A of the cap 122 is locked and attached to the inner periphery of the back end of the second hole 112. In a state in which the harness guide 121 and the cap 122 are respectively pressure inserted to the first hole 111 and the second hole 112 of the spring adjusting case 61, the harness insertion path 121C of the harness guide 121 and the harness insertion path 122C of the cap 122 are arranged so as to be approximately orthogonal, as shown in FIG. 16.

In accordance with the present embodiment, the following operations and effects can be achieved.

(a) The spring adjusting case 61 is previously provided with the harness insertion hole 110 being larger than the outer size of the socket 105 in such a manner as to insert the connecting socket 105 provided in the harness 101 connected to the motor 80 to the spring adjusting case 61 of the spring adjusting jack 60A under the state of being assembled in the outer periphery of the cylinder 11, and the harness 101 is inserted to the harness insertion hole 110 via the seal means 120. Accordingly, after the hydraulic shock absorber 10 is provided with the spring adjusting case 61 of the spring adjusting jack 60A, the socket 105 provided in the harness 101 is inserted into the case 61 from the harness insertion hole 110 of the spring adjusting case 61, and the socket 105 can be connected to the motor 80 which is already provided in the spring adjusting case 61. It is possible to improve an assembling workability of the hydraulic shock absorber 10 by after assembling the harness 101, it is possible to separate the spring adjusting case 61 and the harness 101 in a parts distribution stage, and providing and handling properties thereof are improved.

(b) The harness insertion hole 110 provided in the spring adjusting case 61 is constituted by the two-stage hole having the first hole 111 in the inner surface side of the spring adjusting case 61, and the second hole 112 in the outer surface side of the spring adjusting case 61, the harness guide 121 inserting the harness 101 in the watertight manner is pressure inserted to the first hole 111, and the cap 122 inserting the tube 102 coated by the harness 101 in the watertight manner is pressure inserted to the second hole 112. Accordingly, it is possible to improve a come-off preventing performance such as a sealing performance of the harness 101 introduced to the spring adjusting case 61.

(c) In a state in which the harness guide 121 and the cap 122 are pressure inserted respectively to the first and second holes of the spring adjusting case 61, the harness insertion path 121C of the harness guide 121 and the tube insertion path 122C of the cap 122 are arranged so as to be orthogonal to each other. Accordingly, it is possible to further improve a shielding performance against the high-pressure washing water which is going to make an intrusion into the spring adjusting case 61, and a come-off preventing performance against an external pulling force applied to the harness 101, by the harness guide 121 and the cap 122.

(D) Mounting Structure of Motor 80 (FIGS. 3, 5, 7A to 7C, 8, 19 to 21A and 21B)

The spring adjusting jack 60A is structured such that the mounting structure of the motor 80 to the spring adjusting case 61 is made as shown in FIGS. 3 and 5. The motor 80 is supported at three points in a plan view as shown in FIG. 3 including the motor shaft (not shown) of the motor 80.

The three-point supporting structure of the motor 80 is constituted by a structure in which two mounting bosses 84 provided in the speed reducer 81 arranged in the leading end side of the motor 80 is fixed by a mounting bolt 87 and a washer 87A, and a structure in which a mounting holder 86 wound around a mounting convex portion 83 protruding to an outer side from a terminal end side of the motor 80 in a direction along the motor shaft is screwed to a mounting stay 85 provided in the spring adjusting case 61 in a rising manner by a locking screw 86C.

The speed reducer 81 is provided with the mounting bosses 84 mentioned above at two points on the flat surface which is orthogonal to the output shaft 82, one mounting boss 84 is provided with a round hole 84A (a positioning reference hole) for the bolt 87, and the other mounting boss 84 is provided with an oblong hole 84B for the bolt 87 (FIGS. 7A to 7C). Further, the cylindrical spacer 68 is raised on the motor mounting seat surfaces 67 (FIG. 8) provided at two points of the mounting mating surface 65 of the spring adjusting case 61, and the mounting bolts 87 mentioned above inserted to the round hole 84A and the oblong hole 84B of the mounting bosses 84 at two points of the motor 80 are inserted through the hollow portion of the spacer 68 so as to be screwed with the mounting hole 67A of the motor mounting seat surface 67.

Figure 19:
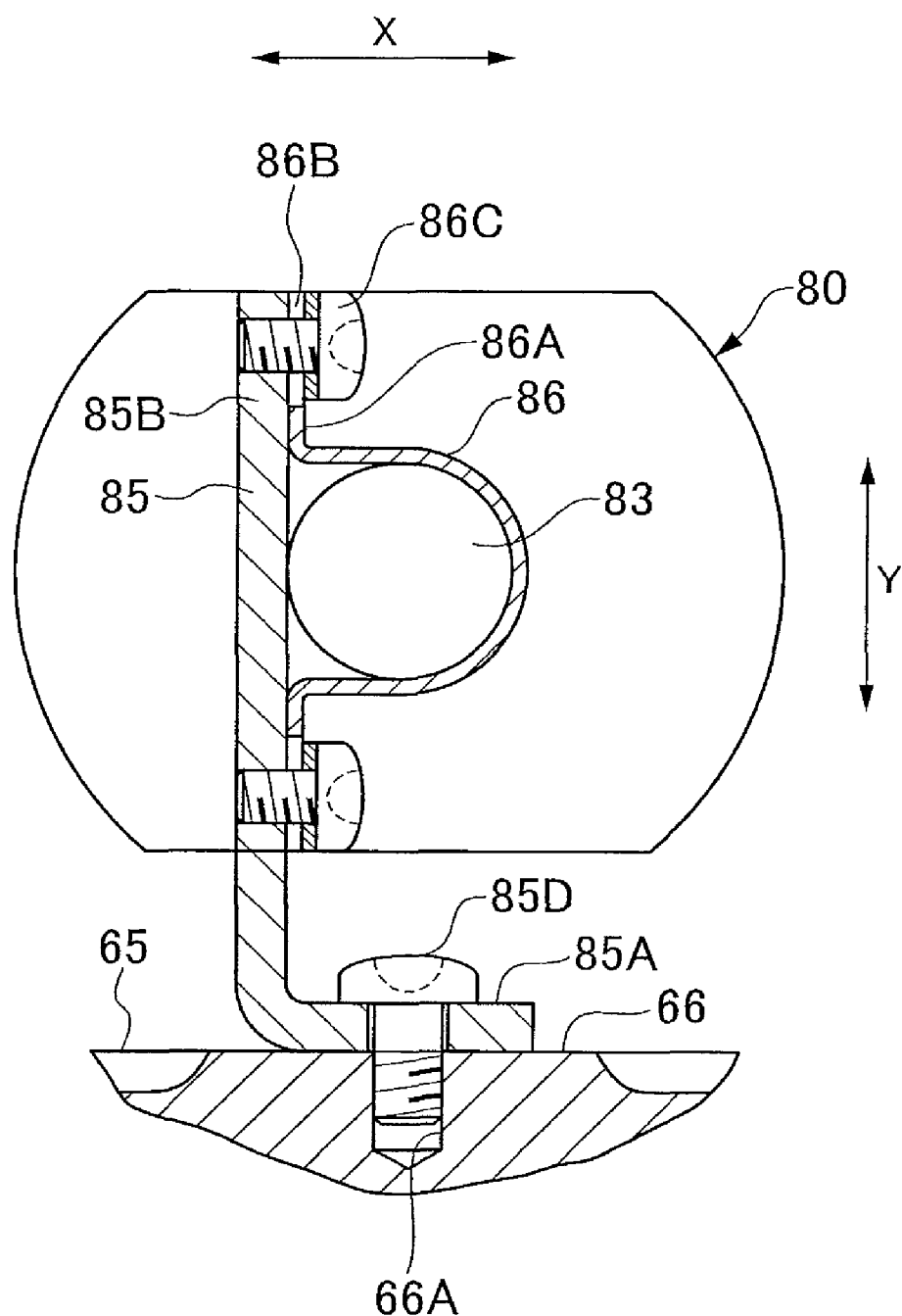
FIG. 19 is a schematic cross sectional view along a line XIX-XIX in FIG. 3.
Figure 20C:
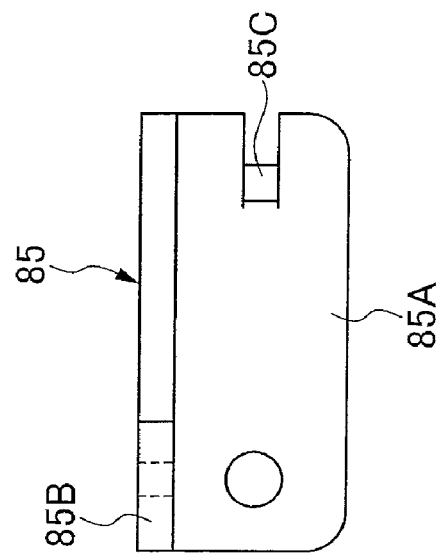
Figure 20B:
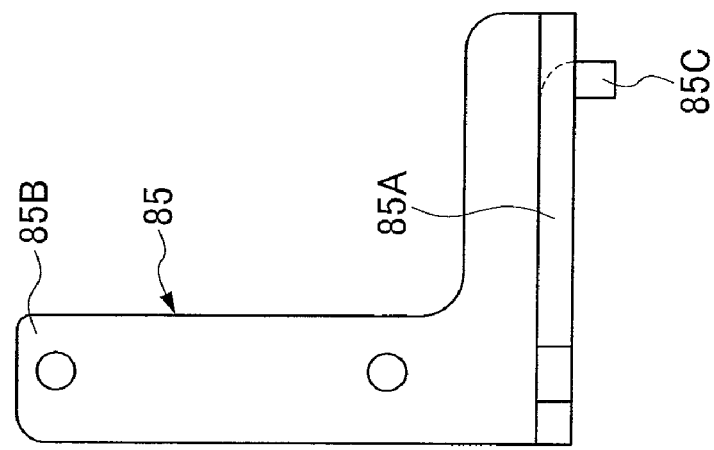
Figure 20A:
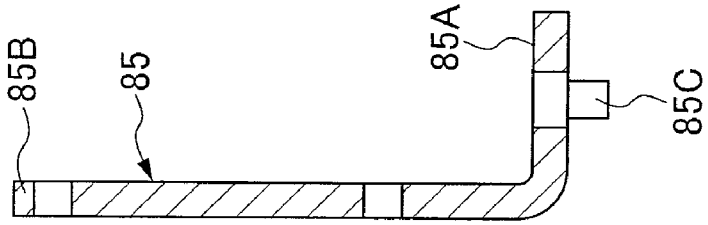
Figure 21A:
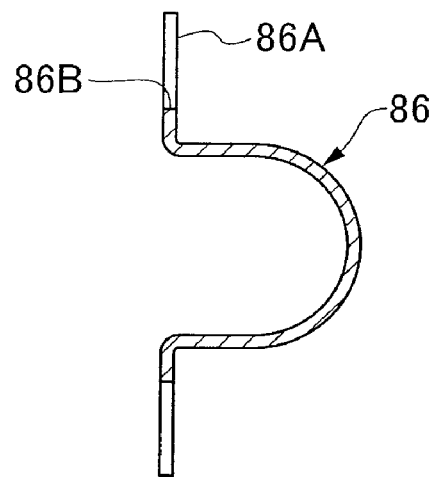
Figure 21B:
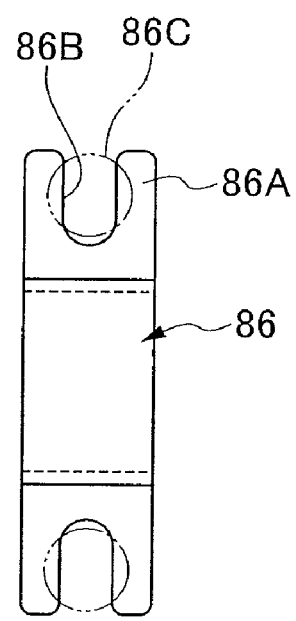

The spring adjusting case 61 is structured, as shown in FIGS. 5 and 19, such that a stay mounting hole 66A and a stay rotation preventing hole 66B are provided in the stay mounting seat surface 66 (FIG. 8) provided in the mounting mating surface 65, a mounting leg 85A of the mounting stay 85 is seated on the stay mounting seat surface 66, a rotation preventing pin 85C notched and bent in the mounting leg 85A is locked into the stay rotation preventing hole 66B, and a mounting screw 85D is inserted into a thread hole of the mounting leg 85A and screwed to the stay mounting hole 66A (FIGS. 20A to 20C). Both side mounting pieces 86A of the mounting holder 86 wound around the mounting convex portion 83 of the motor 80 are fixed to a rising mounting surface 85B of the mounting stay 85 by a locking screw 86C inserted to the slit-shaped screwing hole 86B provided in the mounting piece 86A (FIGS. 21A and 21B).

In the spring adjusting jack 60A, as shown in FIG. 3, a center 80G of gravity of the motor 80 is arranged in a triangle obtained by connecting three points (the mounting bolts 87 and the mounting screw 85D) of the three-point support structure of the motor 80.

Accordingly, a mounting procedure of the motor 80 is as follows.

(1) The mounting leg 85A of the mounting stay 85 is seated on the stay mounting seat surface 66 provided in the mounting mating surface 65 of the spring adjusting case 61, the rotation preventing pin 85C of the mounting stay 85 is locked into the stay rotation preventing hole 66B of the stay mounting seat surface 66, the mounting screw 85D of the mounting stay 85 is screwed to the stay mounting hole 66A of the stay mounting seat surface 66, and the mounting stay 85 is raised.

(2) The mounting bosses 84 at two points of the motor 80 are set to the spacer 68 raised on the motor mounting seat surface 67 at two points of the mounting mating surface 65 of the spring adjusting case 61, the bolts 87 respectively inserted to the round hole 84A and the oblong hole 84B of the mounting bosses 84 at two points are inserted to the hollow portion of the spacer 68 so as to be temporarily tightened to the mounting hole 67A of the motor mounting seat surface 67, and the mounting convex portion 83 of the motor 80 is brought into contact with the mounting surface 85B of the mounting stay 85.

(3) The bolt 87 is inserted into the round hole 84A of the mounting boss 84 and is fully tightened to the mounting hole 67A of the motor mounting seat surface 67, and the bolt 87 is inserted into the oblong hole 84B of the mounting boss 84 and fully tightened to the mounting hole 67A of the motor mounting seat surface 67. On the basis of the fastening and rotating force of the bolt 87, the mounting convex portion 83 of the motor 80 is pressed against the mounting surface 85B of the mounting stay 85 so as to be closely attached.

(4) The mounting holder 86 is wound around the mounting convex portion 83 of the motor 80, and the mounting holder 86 is fixed to the mounting surface 85B of the mounting stay 85 by the locking screw 86C.

At this time, in the item (3) mentioned above, a mounting error in a direction X of the motor 80 is absorbed by applying the mounting convex portion 83 of the motor 80 to the mounting surface 85B of the mounting stay 85 in the fastening and rotating direction of the bolt 87 (FIG. 19). Further, a mounting error in a direction Y of the motor 80 is absorbed by forming the screwing hole 86B of the mounting holder 86 in the item (4) mentioned above as a slot (FIG. 19). Further, a mounting error in a direction Z of the motor 80 is absorbed by arranging the mounting holder 86 in the item (4) mentioned above away from the motor 80 in the direction along the motor shaft of the motor 80 (FIG. 5).

In accordance with the present embodiment, the following operations and effects can be achieved.

(a) The mounting structure of the motor 80 to the spring adjusting case 61 is set to the three-point support structure in a plan view including the motor shaft of the motor 80. Accordingly, a bending stress generated in the mounting portion of the motor 80 to the spring adjusting case 61 is reduced, and it is possible to reduce a strength necessary for the mounting portion. Thereby, a weight saving of the suspension spring adjusting apparatus 60 is achieved.

(b) The three-point support structure in the item (a) mentioned above of the motor 80 is structured by the structure of fixing two mounting bosses 84 provided in the speed reducer 81 arranged in the leading end side of the motor 80 to the spring adjusting case 61 by the bolt 87, and the structure of screwing the mounting holder wound around the mounting convex portion 83 provided in the terminal end side of the motor 80 to the mounting stay 85 provided in a rising manner on the spring adjusting case 61. Accordingly, it is possible to simply and securely support the motor 80 by three points.

(c) Since the center 80G of gravity of the motor 80 is arranged in the triangle obtained by connecting three points of the three-point support structure of the motor 80, it is possible to further reduce the bending stress generated in the mounting portion of the motor 80 to the spring adjusting case 61 in the item (a) mentioned above.

(d) The mounting error of the motor 80 in the direction X can be absorbed by bringing the mounting convex portion 83 of the motor 80 into contact with the mounting surface 85B of the mounting stay 85 in the fastening and rotating direction of the bolt 87, the mounting error of the motor 80 in the direction Y can be absorbed by forming the screwing hole 86B of the holder as the slit, and the mounting error of the motor 80 in the direction Z can be absorbed by moving the holder away from the motor 80 in the direction along the motor shaft. It is possible to absorb the working error or the like of the mounting position provided in the spring adjusting case 61. It is possible to attach the motor 80 to the spring adjusting case 61 and within reason, any abnormal stresses are not generated in each of the mounting portions. Thereby, it is possible to prevent a deterioration of the performance of the motor 80 caused by an application of an offset load or the like to the motor 80, and a durability of the motor 80 is improved. Further, a working precision of each of the parts and a parts precision can be absorbed.

As heretofore explained, embodiments of the present invention have been described in detail with reference to the drawings. However, the specific configurations of the present invention are not limited to the illustrated embodiments but those having a modification of the design within the range of the presently claimed invention are also included in the present invention.

Although the invention has been illustrated and described with respect to an exemplary embodiment thereof, it should be understood by those skilled in the art that the foregoing and various other changes, omissions and additions may be made to the present invention without departing from the spirit and scope thereof. Therefore, the present invention should not be understood as limited to the specific embodiment set out above, but should be understood to include all possible embodiments which can be encompassed within a scope of equivalents thereof with respect to the features set out in the appended claims.

What is claimed is:

1. A suspension spring adjusting apparatus of a hydraulic shock absorber comprising:

a piston rod inserted into a cylinder;

a spring adjusting jack provided in an outer periphery of the cylinder;

a jack chamber provided in a spring adjusting case in which the spring adjusting jack is fixed to the outer periphery of the cylinder, wherein a plunger is provided in the jack chamber, a pump supplying a hydraulic pressure to the jack chamber installed in the spring adjusting case, a motor driving the pump provided in the spring adjusting case, and the motor is covered by a case cover attached to the spring adjusting case; and a suspension spring interposed between a spring receiver supported by the plunger of the spring adjusting jack and a spring receiver provided on a side of the piston rod, wherein a mounting structure of the motor to the spring adjusting case is constituted by a three-point support structure in a plan view including a motor shaft of the motor; two points of the three-point support structure are located at a leading end side of a direction along the motor shaft of the motor and one point of the three-point structure is located at a terminal end side of the direction along the motor shaft of the motor;

wherein the two points of the three-point support structure located at the leading end side of the motor are constituted by a structure of fixing two mounting bosses provided in a speed reducer arranged in the leading end side of the motor in the direction along the motor shaft of the motor to the spring adjusting case by a bolt, and the one point of the three-point support structure is constituted by a structure of screwing a mounting holder wound around a mounting protrusion provided in the terminal end side of the motor in the direction along the motor shaft of the motor to a mounting stay provided in a rising manner on the spring adjusting case;

wherein a center of gravity of the motor is arranged in a triangle obtained by connecting three points of the three-point support structure of the motor.

2. A suspension spring adjusting apparatus of a hydraulic shock absorber as claimed in claim 1, wherein a mounting error in a direction parallel to the bolt is absorbed by applying the mounting protrusion of the motor to a mounting surface of the mounting stay in a fastening and rotating direction of the bolt, wherein a mounting error in a direction normal to the screwing hole is absorbed by forming the screwing hole of the mounting holder as a slot, and wherein a mounting error in a direction parallel to the motor shaft is absorbed by arranging the mounting holder away from the motor in the direction along the motor shaft.

3. A suspension spring adjusting apparatus of a hydraulic shock absorber as claimed in claim 2, wherein the speed reducer is provided with the two mounting bosses at two points on a plane which is orthogonal to an output shaft of the speed reducer, wherein a round hole for the bolt is provided in one mounting boss, and wherein an oblong hole for the bolt is provided in the other mounting boss.

4. A suspension spring adjusting apparatus of a hydraulic shock absorber as claimed in claim 3, wherein a motor mounting seat surface is provided at two points of a mounting mating surface with the case cover in the spring adjusting case, a cylindrical spacer is raised on the motor mounting seat surface, and the mounting bolt inserted to each of the round hole and the oblong hole of two mounting bosses in the speed reducer of the motor is screwed to a mounting hole of the motor mounting seat surface through a hollow portion of the spacer.

5. A suspension spring adjusting apparatus of a hydraulic shock absorber as claimed in claim 1, wherein the speed reducer is provided with the two mounting bosses at two points on a plane which is orthogonal to an output shaft of the speed reducer, wherein a round hole for the bolt is provided in one mounting boss, and wherein an oblong hole for the bolt is provided in the other mounting boss.

6. A suspension spring adjusting apparatus of a hydraulic shock absorber as claimed in claim 5, wherein a motor mounting seat surface is provided at two points of a mounting mating surface with the case cover in the spring adjusting case, a cylindrical spacer is raised on the motor mounting seat surface, and the mounting bolt inserted to each of the round hole and the oblong hole of two mounting bosses in the speed reducer of the motor is screwed to a mounting hole of the motor mounting seat surface through a hollow portion of the spacer.

7. A suspension spring adjusting apparatus of a hydraulic shock absorber as claimed in claim 6, wherein a stay mounting seat surface is provided in a mounting mating surface with the case cover in the spring adjusting case, the stay mounting seat surface is provided with a stay mounting hole and a stay rotation preventing hole, a mounting leg of the mounting stay is seated on the stay mounting seat surface, a rotation preventing pin in the mounting leg is locked into the stay rotation preventing hole, and the mounting screw inserted to the thread hole of the mounting leg is screwed to the stay mounting hole.

* * * * *